(12) United States Patent
Biffle et al.

(10) Patent No.: US 8,970,495 B1
(45) Date of Patent: Mar. 3, 2015

(54) IMAGE STABILIZATION FOR COLOR-SEQUENTIAL DISPLAYS

(75) Inventors: Clifford L. Biffle, Mountain View, CA (US); Josh Weaver, Mountain View, CA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 13/590,378

(22) Filed: Aug. 21, 2012

Related U.S. Application Data

(60) Provisional application No. 61/608,951, filed on Mar. 9, 2012.

(51) Int. Cl.
*G06F 3/033* (2013.01)
*G09G 5/08* (2006.01)

(52) U.S. Cl.
USPC .......................................... 345/158

(58) Field of Classification Search
USPC ........................ 345/7–8, 690–699; 348/42–60
See application file for complete search history.

(56) References Cited

U.S. PATENT DOCUMENTS

2012/0327116 A1* 12/2012 Liu et al. ....................... 345/633

OTHER PUBLICATIONS

G. de Haan, "Large-display video format conversion," Journal of the Society for Information Display, vol. 8, No. 1, 2000, pp. 79-87, online version obtained from http://www.es.ele.tue.nl/~dehaan/pdf/53_J_SID_2000.pdf.
G. de Haan and M.A. Klompenhouwer, "An overview of flaws in emerging television displays and remedial video processing," IEEE Transactions on Consumer Electronics, Aug. 2001, pp. 326-334, online version obtained from http://www.es.ele.tue.n1/~dehaan/pdf/71_tronCE_display_flaws.pdf.
M.A. Klompenhouwer and G. de Haan, "Invited Paper: Video, Display and Processing," Society for Information Display Symposium Digest of Technical Papers, May 25, 2004, pp. 1466-1469, online version obtained from http://www.es.ele.tue.n1/~dehaan/pdf/103_SID04.pdf.

* cited by examiner

*Primary Examiner* — Kumar Patel
*Assistant Examiner* — Amy C Onyekaba
(74) *Attorney, Agent, or Firm* — McDonnell Boehnen Hulbert & Berghoff LLP

(57) ABSTRACT

A computing system that includes a color sequential display (CSD) and an eye-tracking device may determine motion of an eye with respect to the CSD, while displaying temporally sequential color sub-frames of a video display image on CSD. Based on the determined motion, the computing system may determine an expected change in position of the eye with respect to the CSD over a time interval from a first temporally sequential color sub-frame to a second temporally sequential color sub-frame that follows the first temporally sequential color sub-frame. Then, based on the determined expected change in position, the computing system may compensate for the determined motion of the eye by adjusting a display position on the CSD of the second temporally sequential color sub-frame with respect to a display position on the CSD of the first temporally sequential color sub-frame. A head-mounted display is an example of such a computing system.

34 Claims, 11 Drawing Sheets

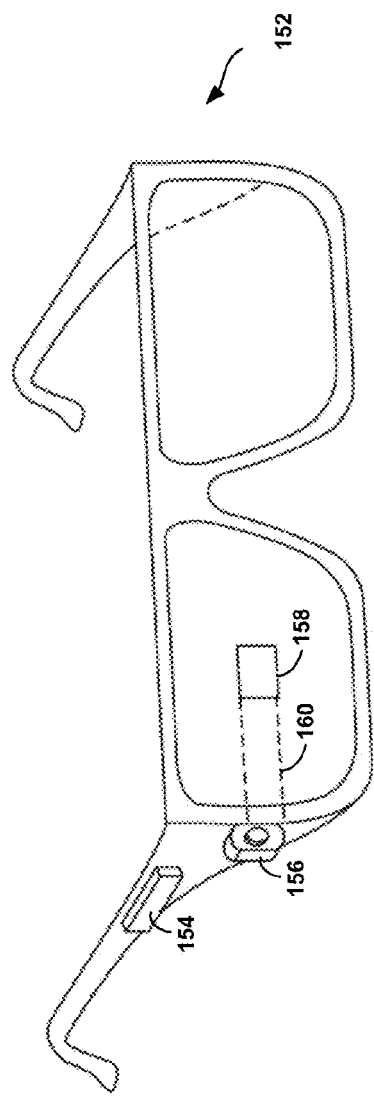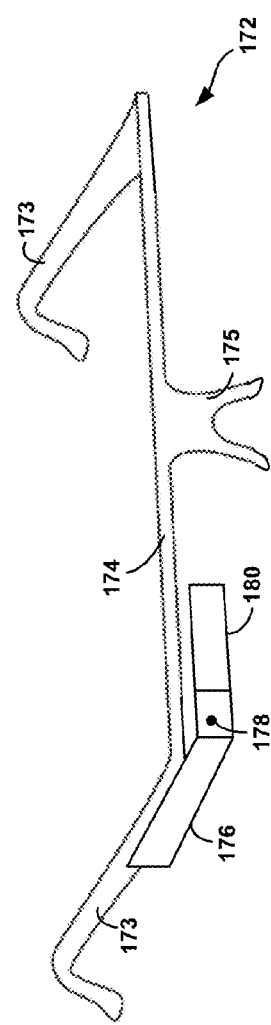

IMAGE STABILIZATION FOR COLOR-SEQUENTIAL DISPLAYS

CROSS-REFERENCE TO RELATED APPLICATIONS

This application claims priority under 35 U.S.C. §119(e) to U.S. Provisional Patent Application Ser. No. 61/608,951, filed on Mar. 9, 2012, which is incorporated herein in its entirety by reference.

BACKGROUND

Unless otherwise indicated herein, the materials described in this section are not prior art to the claims in this application and are not admitted to be prior art by inclusion in this section.

Various technologies can be utilized to provide users with electronic access to data and services in communication networks, as well as to support communication between users. For example, devices such as computers, telephones, and personal digital assistants (PDAs) can be used to exchange information over communication networks including the Internet. Communication networks may in turn provide communication paths and links to servers, which can host applications, content, and services that may be accessed or utilized by users via communication devices. The content can include text, video data, audio data and/or other types of data.

SUMMARY

In one aspect, an example embodiment presented herein provides, in a wearable head-mounted display (HMD), a computer-implemented method comprising: while displaying temporally sequential color sub-frames of a video display image on a color-sequential display (CSD) of the HMD, determining motion of an eye of a user of the HMD with respect to the CSD; based on the determined motion, computing an expected change in position of the eye with respect to the CSD over a time interval from a first temporally sequential color sub-frame to a second temporally sequential color sub-frame that follows the first temporally sequential color sub-frame; and based on the computed expected change in position, compensating for the determined motion of the eye by adjusting a display position on the CSD of the second temporally sequential color sub-frame with respect to a display position on the CSD of the first temporally sequential color sub-frame.

In another aspect, an example embodiment presented herein provides, in a system including a color-sequential display (CSD), a computer-implemented method comprising: while displaying temporally sequential color sub-frames of a display image on the CSD, determining motion of an eye with respect to the CSD; based on the determined motion, computing an expected change in position of the eye with respect to the CSD from one temporally sequential color sub-frame to a next temporally sequential color sub-frame; and based on the computed expected change in position, adjusting a display position on the CSD of the next temporally sequential color sub-frame with respect to a display position on the CSD of the one temporally sequential color sub-frame.

In still another aspect, an example embodiment presented herein provides a wearable head-mounted display (HMD) comprising: means for determining motion of an eye of a user of the HMD with respect to a color-sequential display (CSD) of the HMD, while displaying temporally sequential color sub-frames of a video display image on the CSD; means for computing an expected change in position of the eye with respect to the CSD over a time interval from a first temporally sequential color sub-frame to a second temporally sequential color sub-frame that follows the first temporally sequential color sub-frame, wherein the computing is based on the determined motion; and means for using the computed expected change in position to compensate for the determined motion of the eye by adjusting a display position on the CSD of the second temporally sequential color sub-frame with respect to a display position on the CSD of the first temporally sequential color sub-frame.

In yet another aspect, an example embodiment presented herein provides a non-transitory computer-readable medium having instructions stored thereon that, upon execution by one or more processors of a wearable head-mounted display (HMD), cause the wearable HMD to carry out operations comprising: while displaying temporally sequential color sub-frames of a video display image on a color-sequential display (CSD) of the HMD, determining motion of an eye of a user of the HMD with respect to the CSD; based on the determined motion, computing an expected change in position of the eye with respect to the CSD over a time interval from a first temporally sequential color sub-frame to a second temporally sequential color sub-frame that follows the first temporally sequential color sub-frame; and based on the computed expected change in position, compensating for the determined motion of the eye by adjusting a display position on the CSD of the second temporally sequential color sub-frame with respect to a display position on the CSD of the first temporally sequential color sub-frame.

In still a further aspect, an example embodiment presented herein provides a non-transitory computer-readable medium having instructions stored thereon that, upon execution by one or more processors of a system, cause the system to carry out operations comprising: while displaying temporally sequential color sub-frames of a display image on a color-sequential display (CSD) of the system, determining motion of an eye with respect to the CSD; based on the determined motion, computing an expected change in position of the eye with respect to the CSD from one temporally sequential color sub-frame to a next temporally sequential color sub-frame; and based on the computed expected change in position, adjusting a display position on the CSD of the next temporally sequential color sub-frame with respect to a display position on the CSD of the one temporally sequential color sub-frame.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF DRAWINGS

FIG. 1c illustrates another example wearable head-mounted display, in accordance with an example embodiment.

FIG. 1d illustrates still another example wearable head-mounted display, in accordance with an example embodiment.

DETAILED DESCRIPTION

1. Overview

Figure 1A:
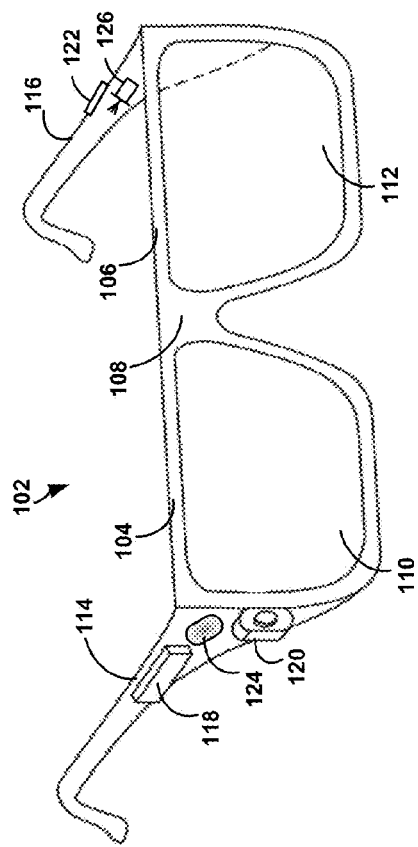
FIG. 1a is a first view of an example wearable head-mounted display, in accordance with an example embodiment.

A color-sequential display (CSD) is a display device in which sequential frames of a multi-color display image are displayed in temporally sequential color sub-frames, each of which contains just one color component of its respective frame. For example, each frame could comprise a red, a green, and a blue sub-frame. In conventional operation, all of the sub-frames of a given frame are displayed at the same pixel position on the CSD. The sub-frame display rate is configured to be fast enough (i.e., within a short enough interval of time) so that all of the color components of a given frame are perceived by a human brain as combined into a single multi-color frame image.

Temporally sequencing color sub-frames on the same pixels enables CSDs to use smaller pixels than traditional displays, which typically employ larger pixels with color sub-pixels used for simultaneous display of color sub-frames. Consequently, CSDs can be made relatively small, and may be well-suited for applications where small size and weight is a consideration. As an example, a wearable computing device might include a head-mount display (HMD) that itself includes a display element having a small form factor.

More particularly, a HMD may include eyeglasses or goggles that can combine computer-generated images projected on a small display element (or elements) in a field-of-view (FOV) with real the "real world" observed through the lens elements. The capability of presenting the combination of the observed real world with the displayed, computer-generated images can be complemented or supplemented with various functions and applications, as well as with various forms of user input and sensory data from ancillary wearable computing components, to provide rich and varied experiences and utility for a user or wearer of the HMD. The potentially small size of a CSD can make it a good option for the display element(s) of a HMD.

However, image and/or color distortion can arise when there is relative motion between the CSD and the eye or eyes of a viewer, because the perceived position of the color sub-frames on the CSD of a given frame might change in the time interval between sub-frames. The perceived change in position on the CSD can correspond to a change in projected location on the retina of the viewer's eye(s) caused by the relative motion between the CSD and the eye(s). When this occurs, the color sub-frames may not be perceived as properly combined into a single image.

For application of CSDs in a HMD, relative motion between the CSD and the eye and/or eyes of the wearer (user) of the HMD may be common, and may even occur a large fraction of the time. This may be the case because the display element(s) of the HMD can typically be close to the user's eyes (e.g., tens of millimeters or less), so that small angular displacements of the eyes may correspond to large linear displacements in a plane of a display element, for example. Sources of motion include vibration of the HMD on the user's head (e.g., while the user is riding on a subway or eating crunchy food), and movement of the user's eyes within the field of view of the display. There may be other sources of motion as well. Moreover, there may be other applications of CSD besides in HMDs for which relative motion between the CSD and a viewer's eye(s) is a consideration.

In accordance with example embodiments, a wearable HMD with a CSD will include one or more devices capable of determining relative motion between the CSD and an eye (or eyes) of a user of the HMD. The HMD may use the determined relative motion to adjust the display position on the CSD of sub-frames, so as to compensate for perceived misalignment of sub-frames resulting from the relative motion. That is, the relative motion can be used to predict a change in position of the user's eye with respect to the CSD in the time interval between one temporally sequential color sub-frame to the next. The predicted change in position can then be used to shift the display position on the CSD of the next sub-frame by an amount that causes the sub-frame to appear to the user not to have moved relative to the previous sub-frame.

More specifically, the shift in display position from one temporally sequential color sub-frame to the next can have the effect of projecting all of the sub-frames of a given frame onto the same location on the retina of the user's eye(s), even though the user's eye(s) has (have) moved with respect to the CSD. As a result, the sub-frames of each frame may be perceived as being properly aligned and undistorted by the user.

In accordance with example embodiments, each frame may comprise a red (R), a green (G), and a blue (B) sub-frame, displayed in R-G-B order. For a given frame, a display position adjustment could be made for the G sub-frame with respect to the display position on the CSD of the R sub-frame; and a display position adjustment could be made for the B sub-frame with respect to the display position on the CSD of the G frame-sub. Further, a display position adjustment could be made for the R sub-frame of the next frame with respect to the display position on the CSD of the B sub-frame of the previous frame. Other numbers and color values (e.g., other than and/or in addition to R, G, B) of color sub-frames could be used as well.

In example embodiments, the one or more devices capable of determining relative motion between the CSD and an eye(s) of a user of the HMD could include one or more eye-tracking camera device(s). The eye-tracking camera device(s) may be mounted on or integrated in the HMD, and configured to face toward the eye(s) of the user of the HMD so as to be able to capture video images of the eye(s) as viewed by the camera device(s). In particular, successive frames of video data may capture sequential images of the eye(s). Frame-by-frame analysis in real time, for example using one or more known techniques for tracking movement of the pupil and iris, may be used to determine and/or predict in real time the angular motion of the eye(s) and eye gaze-direction. That movement could then be translated into angular movement with respect to the CDS and/or a reference position on the CSD in real time.

In accordance with example embodiments, the eye-tracking camera device(s) may be configured with a frame rate that is high enough in comparison to the sub-frame rate to enable real-time determination and motion compensation in the time interval between sub-frames. Alternatively, eye-tracking measurements may be used to support an analytical model of eye movement, which may in turn be used to predict eye movement as a function of time in the time interval between sub-frames. Different analytical models could be used depending on user activity. For example, one analytical model could correspond to reading, another to field-of-view scanning.

In accordance with example embodiments, the one or more devices capable of determining relative motion between the CSD and an eye(s) of a user of the HMD could also include one or more motion detectors. By way of example, a motion detector could include a three-axis accelerometer and/or a three-axis gyroscope. Detected motion could be translated into relative motion between the CSD and the user's head, which could in turn be interpreted as relative motion between the CSD and the user's eye(s). As with an eye-tracking camera device, a motion detection device could provide measurements at a rate that is high enough in comparison to the sub-frame rate to enable real-time determination and motion compensation in the time interval between sub-frames. Alternatively, the measurement rate may be used to support an analytical model of eye movement, which may in turn be used to predict eye movement as a function of time, including time interval between sub-frames.

In accordance with example embodiments, eye-tracking data from the eye-tracking camera device(s) and motion detection data from the motion detector(s) may be combined to provide more refined determinations of relative motion between the CSD and the eye(s) of a user of the HMD. Such combined data could be used to determine motion and spatial rotation of the HMD, as well as relative motion between the CSD and the user's eye(s).

In accordance with example embodiments, the CSD may include a blank (e.g., black) border or frame in order to mask any artifact effects that can arise from portions of particular sub-frames that may be shifted out of a displayable region of the CSD by motion adjustment used to compensate for eye movement. For example, if a G sub-frame will be shifted three pixels beyond an edge of the CSD, a display border of three pixels could be used to truncate or crop the R sub-frame along that edge as well. This truncation or cropping of the display region could ensure that only full R-G-B sub-frames are displayed everywhere within the border.

In accordance with example embodiments, eye-motion compensation techniques may include one or more devices to carry out one or more methods. In addition, the one or more methods could be implemented as executable instructions stored on non-transitory computer-readable media.

2. Example Systems and Network

In general, example embodiments may be implemented in or may take the form of a wearable computer, and will be illustrated as such herein by way of example. In particular, an example embodiments may be implemented in association with or take the form of a head-mountable display (HMD), or a computing system that receives data from an HMD, such as a cloud-based server system that may be part of or connected to a network.

However, example embodiments may also be implemented in or take the form of other devices, such as a mobile phone, among others. Example embodiments may further include and/or may take the form of a non-transitory computer readable medium (or media), which has program instructions stored thereon that are executable by one or more processors to provide the functionality described herein. In additon, example embodiments may also further include and/or take the form of a device such as a wearable computer or mobile phone, or a subsystem of such a device, which includes such a non-transitory computer readable medium having such program instructions stored thereon.

a. Example Wearable Computing System

In accordance with an example embodiment, a wearable computing system may comprise various components, including one or more processors, one or more forms of memory, one or more sensor devices, one or more I/O devices, one or more communication devices and interfaces, and a head-mounted display (HMD), all collectively arranged in a manner to make the system wearable by a user. The wearable computing system may also include machine-language logic (e.g., software, firmware, and/or hardware instructions) stored in one or another form of memory and executable by one or another processor of the system in order to implement one or more programs, tasks, applications, or the like. The wearable computing system may be configured in various form factors, including, without limitation, integrated in the HMD as a unified package, or distributed, with one or more elements integrated in the HMD and one or more others separately wearable (e.g., as a garment, in a garment pocket, as jewelry, etc.).

Although described above as a component of a wearable computing system, it is sometimes convenient to consider an HMD to be (or at least to represent) the wearable computing system. Accordingly, unless otherwise specified, the terms "wearable head-mounted display" (or "wearable HMD") or just "head-mounted display" (or "HMD") will be used herein to refer to a wearable computing system, in either an integrated (unified package) form, a distributed (or partially distributed) form, or other wearable form.

FIG. 1a illustrates an example wearable computing system 100 for receiving, transmitting, and displaying data. In accordance with an example embodiment, the wearable computing system 100 is depicted as a wearable HMD taking the form of eyeglasses 102. However, it will be appreciated that other types of wearable computing devices could additionally or alternatively be used, including a monocular display configuration having only one lens-display element.

As illustrated in FIG. 1a, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed, either directly or by way of a reflecting surface. In addition, at least a portion of each lens elements 110 and 112 may be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, the wearable computing system 100 may be connected to or be integral to a head-mounted helmet structure. Other possibilities exist as well.

The wearable computing system 100 may also include an on-board computing system 118, a video camera 120, a sensor 122, a finger-operable touch pad 124, and a communication interface 126. The on-board computing system 118 is shown to be positioned on the extending side-arm 114 of the eyeglasses 102; however, the on-board computing system 118 may be provided on other parts of the eyeglasses 102. The on-board computing system 118 may include, for example, a one or more processors and one or more forms of memory. The on-board computing system 118 may be configured to receive and analyze data from the video camera 120, the sensor 122, the finger-operable touch pad 124, and the wireless communication interface 126 (and possibly from other sensory devices and/or user interfaces) and generate images for output to the lens elements 110 and 112.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Video cameras with a small form factor, such as those used in cell phones or webcams, for example, may be incorporated into an example of the wearable system 100. Although FIG. 1a illustrates one video camera 120, more video cameras may be used, and each may be configured to capture the same view, or to capture different views. For example, the video camera 120 may be forward facing to capture at least a portion of a real-world view perceived by the user. This forward facing image captured by the video camera 120 may then be used to generate an augmented reality where computer generated images appear to interact with the real-world view perceived by the user.

The sensor 122 may be used to measure and/or determine location, orientation, and motion information, for example. Although represented as a single component mounted on the extending side-arm 116 of the eyeglasses 102, the sensor 122 could in practice include more than one type of sensor device or element provided on one or more different parts of the eyeglasses 102.

By way of example and without limitation, the sensor 122 could include one or more of motion detectors (e.g., one or more gyroscopes and/or accelerometers), one or more magnetometers, and a location determination device (e.g., a GPS device). Gyroscopes, accelerometers, and magnetometers may be integrated into what is conventionally called an "inertial measurement unit" (IMU). An IMU may, in turn, be part of an "attitude heading reference system" (AHRS) that computes (e.g., using the on-board computing system 118) a pointing direction of the HMD from IMU sensor data, possibly together with location information (e.g., from a GPS device). Accordingly, the sensor 122 could include or be part of an AHRS. Other sensing devices or elements may be included within the sensor 122 and other sensing functions may be performed by the sensor 122.

The finger-operable touch pad 124, shown mounted on the extending side-arm 114 of the eyeglasses 102, may be used by a user to input commands. However, the finger-operable touch pad 124 may be positioned on other parts of the eyeglasses 102. Also, more than one finger-operable touch pad may be present on the eyeglasses 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel to the pad surface, in a direction normal to the pad surface, or both, and may also be capable of sensing a level of pressure applied. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge of the finger-operable touch pad 124. Although not shown in FIG. 1a, the eyeglasses 102 could include one more additional finger-operable touch pads, for example attached to the extending side-arm 316, which could be operated independently of the finger-operable touch pad 124 to provide a duplicate and/or different function.

The communication interface 126 could include an antenna and transceiver device for support of wireline and/or wireless communications between the wearable computing system 100 and a remote device or communication network. For instance, the communication interface 126 could support wireless communications with any or all of 3G and/or 4G cellular radio technologies (e.g., CDMA, EVDO, GSM, UMTS, LTE, WiMAX), as well as wireless local or personal area network technologies such as a Bluetooth, Zigbee, and WiFi (e.g., 802.11a, 802.11b, 802.11g). Other types of wireless access technologies could be supported as well. The communication interface 126 could enable communications between the wearable computing system 100 and one or more end devices, such as another wireless communication device (e.g., a cellular phone or another wearable computing device), a user at a computer in a communication network, or a server or server system in a communication network. The communication interface 126 could also support wired access communications with Ethernet or USB connections, for example.

Figure 1B:
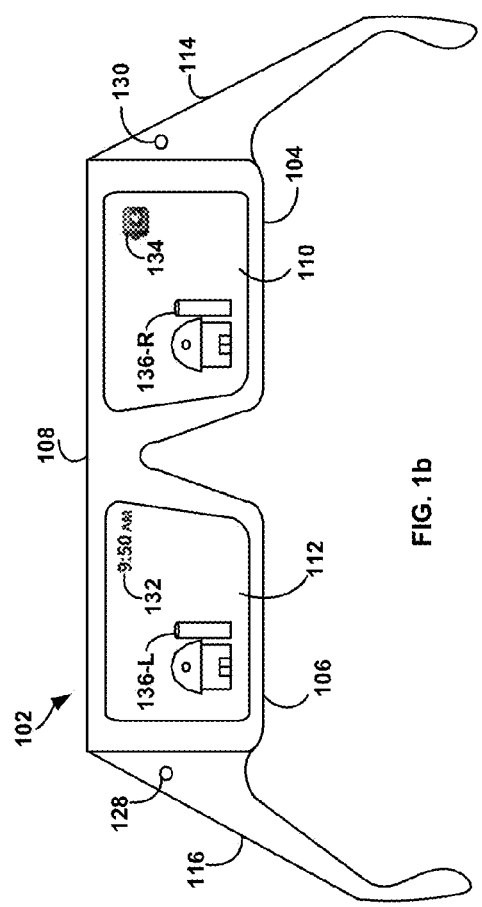
FIG. 1b is a second view of the example wearable head-mounted display of FIG. 1a, in accordance with an example embodiment.

FIG. 1b illustrates another view of the wearable computing system 100 of FIG. 1a. As shown in FIG. 1b, the lens elements 110 and 112 may act as display elements. In this regard, the eyeglasses 102 may include a first projector 128 coupled to an inside surface of the extending side-arm 116 and configured to project a display image 132 onto an inside surface of the lens element 112. Additionally or alternatively, a second projector 130 may be coupled to an inside surface of the extending side-arm 114 and configured to project a display image 134 onto an inside surface of the lens element 110.

The lens elements 110 and 112 may act as a combiner in a light projection system and may include a coating that reflects the light projected onto them from the projectors 128 and 130. Alternatively, the projectors 128 and 130 could be scanning laser devices that interact directly with the user's retinas. The projectors 128 and 130 could function to project one or more still and/or video images generated by one or more display elements (not shown). The projected images could thereby be caused to appear within the field of view of the lens elements 110 and/or 112 via the coating and/or by direct scanning.

In further accordance with example embodiments, the display elements (not shown) could be implemented as one or more color-sequential displays (CSDs). Operation of CSDs is discussed in detail below. Alternative and/or additional forms of display elements are possible as well.

A forward viewing field may be seen concurrently through lens elements 110 and 112 with projected or displayed images (such as display images 132 and 134). This is represented in FIG. 1*b* by the field of view (FOV) object 136-L in the left lens element 112 and the same FOV object 136-R in the right lens element 110. The combination of displayed images and real objects observed in the FOV may be one aspect of augmented reality, referenced above. In addition, images could be generated for the right and left lens elements produce a virtual three-dimensional space when right and left images are synthesized together by a wearer of the HMD. Virtual objects could then be made to appear to be located in and occupy the actual three-dimensional space viewed transparently through the lenses.

Although not explicitly shown in the figures, the HMD could include an eye-tracking system or a portion of such a system. In an example embodiment, the HMD could include inward- or rearward-facing (i.e., eye-facing) light source(s) and/or camera(s) to facilitate eye-tracking functions. For example, an HMD may include inward-facing light sources, such as an LED(s), at generally known location(s) with respect to one another and/or with respect to an eye under observation. The inward-facing camera may therefore capture images that include the reflections of the light source(s) off the eye, or other observable eye-movement information that may form eye-tracking data or an eye-tracking signal. The eye-tracking data or eye-tracking signal may then be analyzed to determine the position and movement of the eye (or eyes) as seen by the eye-tracking system or device. Eye movement may also be reference to other components of the HMD, such as positions in a plane of the lens elements 110 and/or 112, or the displayable regions thereof.

In alternative embodiments, other types of display elements may also be used. For example, lens elements 110, 112 may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

Although not shown in FIGS. 1*a* and 1*b*, the wearable system 100 can also include one or more components for audio output. For example, wearable computing system 100 can be equipped with speaker(s), earphone(s), and/or earphone jack(s). Other possibilities exist as well.

While the example computing system 100 of the example embodiment illustrated in FIGS. 1*a* and 1*b* is configured as a unified package, integrated in the HMD component, other configurations are possible as well. For example, although not explicitly shown in FIGS. 1*a* and 1*b*, the wearable computing system 100 could be implemented in a distributed architecture in which all or part of the on-board computing system 118 is configured remotely from the eyeglasses 102. For example, some or all of the on-board computing system 118 could be made wearable in or on clothing as an accessory, such as in a garment pocket or on a belt clip. Similarly, other components depicted in FIGS. 1*a* and/or 1*b* as integrated in the eyeglasses 102 could also be configured remotely from the HMD component. In such a distributed architecture, certain components might still be integrated in HMD component. For instance, one or more sensors (e.g., a magnetometer, gyroscope, etc.) could be integrated in eyeglasses 102.

In an example distributed configuration, the HMD component (including other integrated components) could communicate with remote components via the communication interface 126 (or via a dedicated connection, distinct from the communication interface 126). By way of example, a wired (e.g. USB or Ethernet) or wireless (e.g., WiFi or Bluetooth) connection could support communications between a remote computing system and a HMD component. Additionally, such a communication link could be implemented between a HMD component and other remote devices, such as a laptop computer or a mobile telephone, for instance.

FIG. 1*c* illustrates another wearable computing system according to an example embodiment, which takes the form of a HMD 152. The HMD 152 may include frame elements and side-arms such as those described with respect to FIGS. 1*a* and 1*b*. The HMD 152 may additionally include an on-board computing system 154 and a video camera 156, such as those described with respect to FIGS. 1*a* and 1*b*. The video camera 156 is shown mounted on a frame of the HMD 152. However, the video camera 156 may be mounted at other positions as well.

As shown in FIG. 1*c*, the HMD 152 may include a single display 158 which may be coupled to the device. The display 158 may be formed on one of the lens elements of the HMD 152, such as a lens element described with respect to FIGS. 1*a* and 1*b*, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

FIG. 1*d* illustrates another wearable computing system according to an example embodiment, which takes the form of a HMD 172. The HMD 172 may include side-arms 173, a center frame support 174, and a bridge portion with nosepiece 175. In the example shown in FIG. 1*d*, the center frame support 174 connects the side-arms 173. The HMD 172 does not include lens-frames containing lens elements. The HMD 172 may additionally include an on-board computing system 176 and a video camera 178, such as those described with respect to FIGS. 1*a* and 1*b*.

The HMD 172 may include a single lens element 180 that may be coupled to one of the side-arms 173 or the center frame support 174. The lens element 180 may include a display such as the display described with reference to FIGS. 1*a* and 1*b*, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

Figure 2:
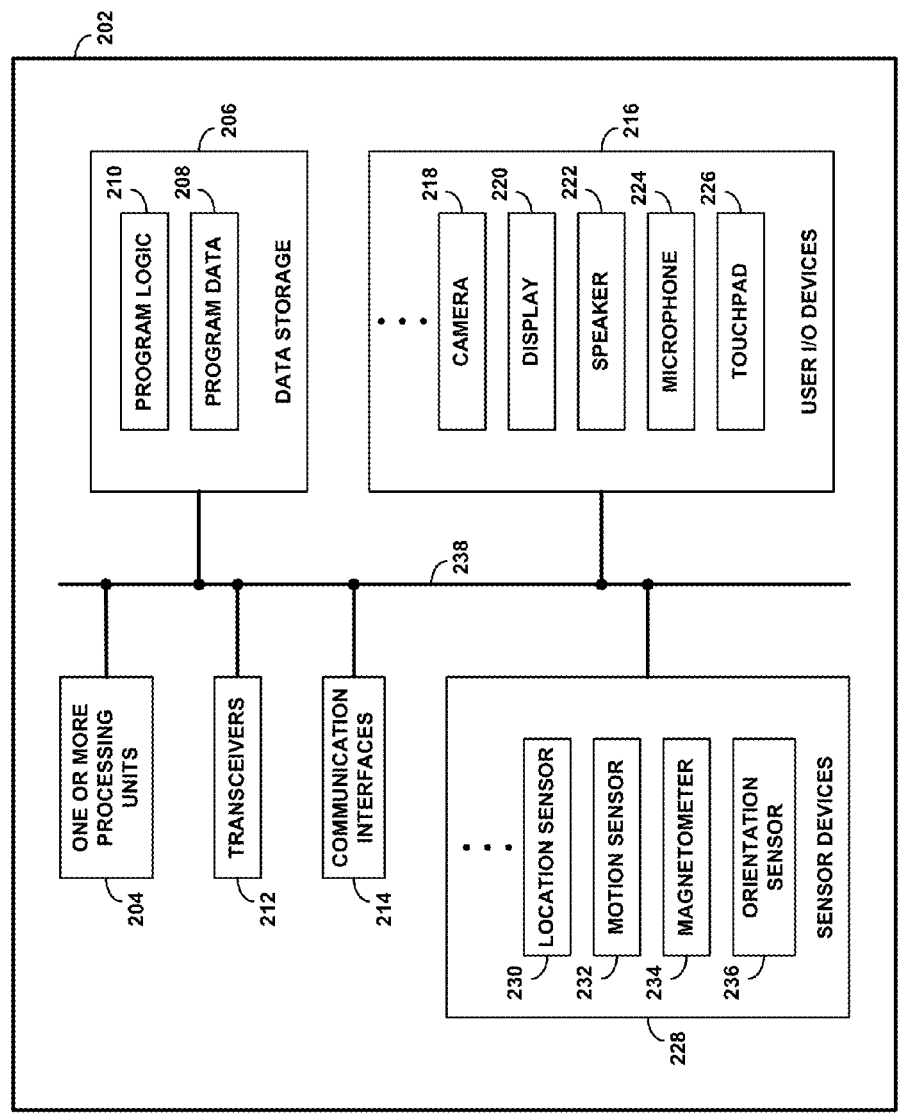
FIG. 2 is block diagram of a wearable head-mounted display, in accordance with an example embodiment.

FIG. 2 is a block diagram depicting functional components of an example wearable computing system 202 in accordance with an example embodiment. As shown in FIG. 2, the example wearable computing system 202 includes one or more processing units 204, data storage 206, transceivers 212, communication interfaces 214, user input/output (I/O) devices 216, and sensor devices 228, all of which may be coupled together by a system bus 238 or other communicative interconnection means. These components may be arranged to support operation in accordance with an example embodiment of a wearable computing system, such as system 100 shown in FIGS. 1a and 1b, or other a wearable HMD.

The one or more processing units 204 could include one or more general-purpose processors (e.g., INTEL microprocessors) and/or one or more special-purpose processors (e.g., dedicated digital signal processor, application specific integrated circuit, etc.). In turn, the data storage 206 could include one or more volatile and/or non-volatile storage components, such as magnetic or optical memory or disk storage. Data storage 206 can be integrated in whole or in part with processing unit 204, as cache memory or registers for instance. As further shown, data storage 206 is equipped to hold program logic 208 and program data 210.

Program logic 208 could include machine language instructions (e.g., software code, firmware code, etc.) that define routines executable by the one or more processing units 204 to carry out various functions described herein. Program data 210 could contain data used or manipulated by one or more applications or programs executable by the one or more processors. Such data can include, among other forms of data, program-specific data, user data, input/output data, sensor data, or other data and information received, stored, retrieved, transmitted, analyzed, or modified in the course of execution of one or more programs or applications.

The transceivers 212 and communication interfaces 214 may be configured to support communication between the wearable computing system 202 and one or more end devices, such as another wireless communication device (e.g., a cellular phone or another wearable computing device), a user at a computer in a communication network, or a server or server system in a communication network. The transceivers 212 may be coupled with one or more antennas to enable wireless communications, for example, as describe above for the wireless communication interface 126 shown in FIG. 1a. The transceivers 212 may also be coupled with one or more and wireline connectors for wireline communications such as Ethernet or USB. The transceivers 212 and communication interfaces 214 could also be used support communications within a distributed-architecture in which various components of the wearable computing system 202 are located remotely from one another. In this sense, the system bus 238 could include elements and/or segments that support communication between such distributed components.

As shown, the user I/O devices 216 include a camera 218, a display 220, a speaker 222, a microphone 224, and a touchpad 226. The camera 218 could correspond to the video camera 120 described in the discussion of FIG. 1a above. Similarly, the display 220 could correspond to an image processing and display system for making images viewable to a user (wearer) of an HMD. The display 220 could include, among other elements, the first and second projectors 128 and 130 coupled with lens elements 112 and 110, respectively, for generating image displays as described above for FIG. 1b. The touchpad 226 could correspond to the finger-operable touch pad 124, as described for FIG. 1a. The speaker 422 and microphone 224 could similarly correspond to components referenced in the discussion above of FIGS. 1a and 1b. Each of the user I/O devices 216 could also include a device controller and stored, executable logic instructions, as well as an interface for communication via the system bus 238.

The sensor devices 228, which could correspond to the sensor 122 described above for FIG. 1a, include a location sensor 230, a motion sensor 232, one or more magnetometers 234, and an orientation sensor 236. The location sensor 230 could correspond to a Global Positioning System (GPS) device, or other location-determination device (e.g. mobile phone system triangulation device, etc.). The motion sensor 232 could correspond to one or more accelerometers and/or one or more gyroscopes. A typical configuration may include three accelerometers oriented along three mutually orthogonal axes, for example. A similar configuration of three magnetometers can also be used.

The orientation sensor 236 could include or be part of an AHRS for providing theodolite-like functionality for determining an angular orientation of a reference pointing direction of the HMD with respect to a local terrestrial coordinate system. For instance, the orientation sensor could determine an altitude angle with respect to horizontal and an azimuth angle with respect to a reference directions, such as geographic (or geodetic) North, of a forward pointing direction of the HMD. Other angles and coordinate systems could be used as well for determining orientation.

Each of the sensor devices 228 could also include a device controller and stored, executable logic instructions, as well as an interface for communication via the system bus 238.

It will be appreciated that there can be numerous specific implementations of a wearable computing system or wearable HMD, such as the wearable computing system 202 illustrated in FIG. 2. Further, one of skill in the art would understand how to devise and build such an implementation.

b. Example Network

In an example embodiment, an HMD can support communications with a network and with devices in or communicatively connected with a network. Such communications can include exchange of information between the HMD and another device, such as another connected HMD, a mobile computing device (e.g., mobile phone or smart phone), or a server. Information exchange can support or be part of services and/or applications, including, without limitation, uploading and/or downloading content (e.g., music, video, etc.), and client-server communications, among others.

Figure 3:
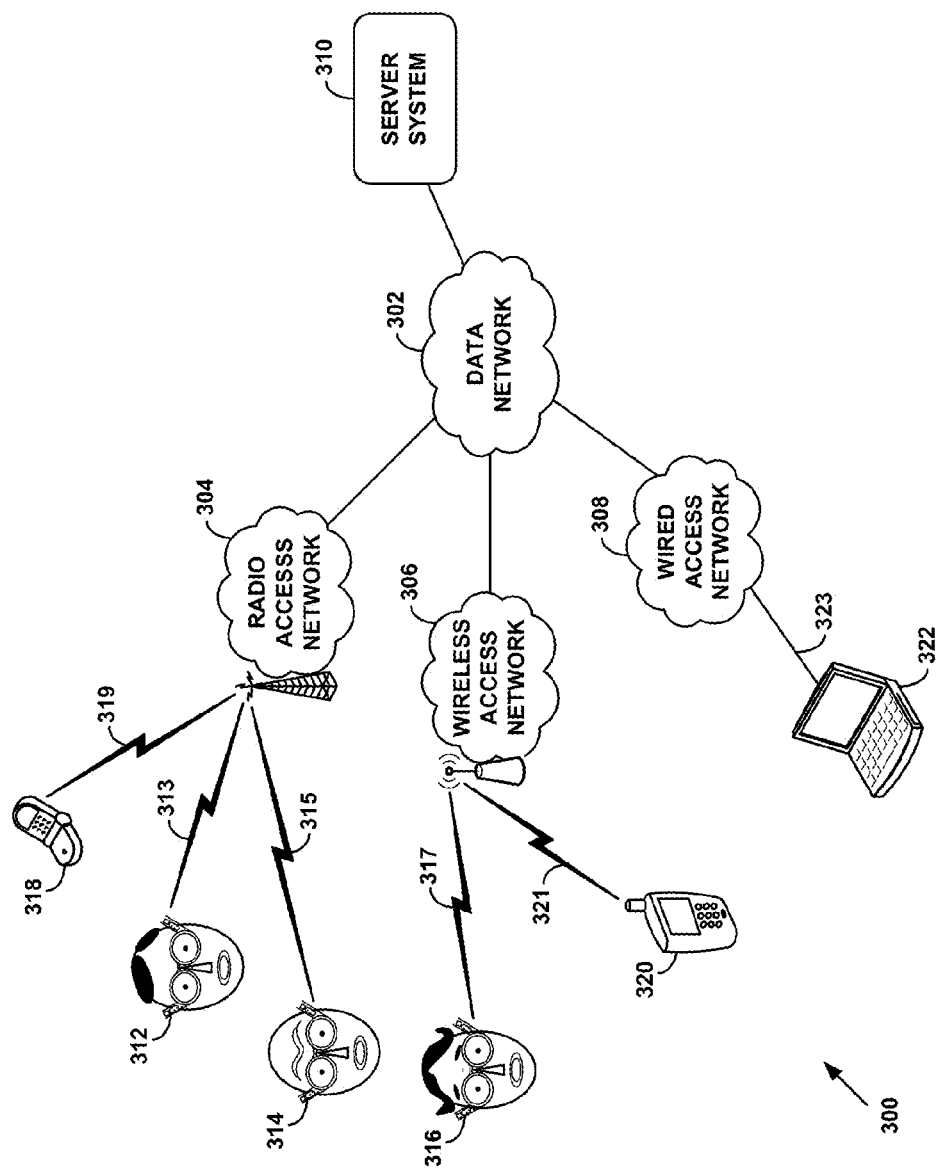
FIG. 3 is a simplified block diagram of a communication network, in accordance with an example embodiment.

FIG. 3 illustrates one view of a network 300 in which one or more HMDs could engage in communications. As depicted, the network 300 includes a data network 302 that is connected to each of a radio access network (RAN) 304, a wireless access network 306, and a wired access network 308. The data network 302 could represent the one or more interconnected communication networks, such as or including the Internet. The radio access network 304 could represent a service provider's cellular radio network supporting, for instance, 3G and/or 4G cellular radio technologies (e.g., CDMA, EVDO, GSM, UMTS, LTE, WiMAX). The wireless access network 306 could represent a residential or hot-spot wireless area network supporting, such as, Bluetooth, ZigBee, and WiFi (e.g., 802.11a, 802.11b, 802.11g). The wired access network 308 could represent a residential or commercial local area network supporting, for instance, Ethernet.

The network 300 also includes a server system 310 connected to the data network 302. The server system 310 could represent a website or other network-based facility for providing one or another type of service to users. For instance, in accordance with an example embodiment, the server system 310 could host an online social networking service or website. As another example, the server system 310 could provide a network-based information search service. As still a further example, the server system 310 could receive eye-tracking data from a HMD, and returned analyzed results to the HMD.

FIG. 3 also shows various end-user and/or client devices connected to the network 300 via one of the three access networks. By way of example, an HMD 312 is connected to the RAN 304 via an air interface 313 (e.g., a 3G or 4G technology), and an HMD 314 is connected to the RAN 304 via an air interface 315 (e.g., a 3G or 4G technology). Also by way of example, an HMD 316 is connected to the wireless access network 306 via an air interface 317 (e.g., a WiFi technology). In addition and also by way of example, a mobile phone 318 is shown connected to the RAN 304 via an air interface 319, a smart phone 320 is shown connected to the wireless access network 306 via an air interface 321, and a laptop computer 322 is shown connected to the wired access network 308 via a wired interface 323. Each of the end-user devices could communicate with one or another network-connected device via its respective connection with the network. It could be possible as well for some of these end-user devices to communicate directly with each other (or other end-user devices not shown).

Each of the HMDs 312, 314, and 316 is depicted as being worn by different user (each user being represented by a cartoon face) in order to signify possible user-related variables, circumstances, and applications that may be associated with each HMD. For instance, the HMD 312 could at one time upload content to an online social networking service, whereas the HMD 314 could at the same or another time send a request to a network-based information search service. Users could interact with each other and/or with the network via their respective HMDs. Other examples are possible as well. For the purposes of most of the discussion herein it is usually sufficient to reference only an HMD without referencing the user (or wearer) the HMD. Explicit reference to or discussion of a user (or wearer) of an HMD will be made as necessary.

c. Example Server System

Figure 4A:
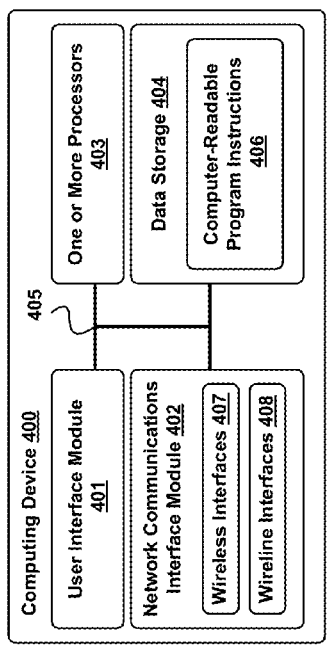
FIG. 4a is a block diagram of a computing device, in accordance with an example embodiment.
Figure 4B:
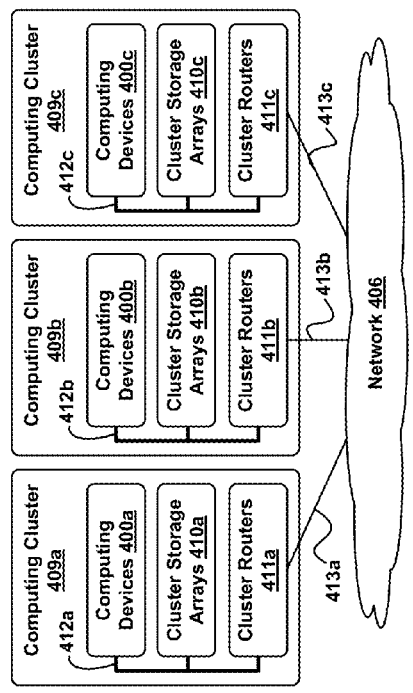
FIG. 4b depicts a network with clusters of computing devices of the type shown in FIG. 4a, in accordance with an example embodiment.

A network server, such as the server system 310 in FIG. 3, could take various forms and be implemented in one or more different ways. FIGS. 4a and 4b illustrate two example embodiments of a server system: an integrated system including a representative computing device (FIG. 4a), and a distributed system (FIG. 4b) including multiple representative computing devices, as well as additional system elements, communicatively connected together.

FIG. 4a is a block diagram of a computing device 400 in accordance with an example embodiment. The computing device 400 can include a user interface module 401, a network-communication interface module 402, one or more processors 403, and data storage 404, all of which can be linked together via a system bus, network, or other connection mechanism 405. The computing device 400 may be any type of device that can receive data and provide information for display in association with the received data. For example, the device 400 may take the form of or be included as part of a wearable computing device, such as the HMDs 102, 152, or 172 described with reference to FIGS. 1a-1d. Further, as noted above, computing device 400 could also take the form of or be included in an integrated server system. Computing device 400 may take other forms and/or be included as part of other systems as well.

The user interface module 401 can be operable to send data to and/or receive data from external user input/output devices. For example, the user interface module 401 can be configured to send/receive data to/from user input devices such as a keyboard, a keypad, a touch screen, a computer mouse, a track ball, a joystick, and/or other similar devices, now known or later developed. The user interface module 401 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 401 can also be configured to generate audible output(s), such as a speaker, speaker jack, audio output port, audio output device, earphones, and/or other similar devices, now known or later developed.

The network-communications interface module 402 can include one or more wireless interfaces 407 and/or wireline interfaces 408 that are configurable to communicate via a network, such as the network 302 shown in FIG. 3. The wireless interfaces 407 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 408 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 402 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 403 can include one or more general purpose processors and/or one or more special purpose processors (e.g., digital signal processors, application specific integrated circuits, etc.). The one or more processors 403 can be configured to execute computer-readable program instructions 406 that are contained in the data storage 404 and/or other instructions as described herein.

The data storage 404 can include one or more computer-readable storage media that can be read or accessed by at least one of the processors 403. The one or more computer-readable storage media can include volatile and/or non-volatile storage components, such as optical, magnetic, organic or other memory or disc storage, which can be integrated in whole or in part with at least one of the one or more processors 403. In some embodiments, the data storage 404 can be implemented using a single physical device (e.g., one optical, magnetic, organic or other memory or disc storage unit), while in other embodiments, the data storage 404 can be implemented using two or more physical devices.

Computer-readable storage media associated with data storage 404 and/or other computer-readable media described herein can also include non-transitory computer-readable media such as computer-readable media that stores data for short periods of time like register memory, processor cache, and random access memory (RAM). Computer-readable storage media associated with data storage 404 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 404 and/or other computer-readable media described herein can also be any other volatile or non-volatile storage systems. Computer-readable storage media associated with data storage 404 and/or other computer-readable media described herein can be considered computer readable storage media for example, or a tangible storage device.

The data storage 404 can include computer-readable program instructions 406 and perhaps additional data. In some embodiments, the data storage 404 can additionally include storage required to perform at least part of the herein-described techniques, methods, and/or at least part of the functionality of the herein-described devices and networks.

FIG. 4b depicts a network 406 with computing clusters 409a, 409b, and 409c in accordance with an example embodiment. In FIG. 4b, functions of a network server, such as the server system 310 in FIG. 3, can be distributed among three computing clusters 409a, 409b, and 408c. The computing cluster 409a can include one or more computing devices 400a, cluster storage arrays 410a, and cluster routers 411a, connected together by local cluster network 412a. Similarly, computing cluster 409b can include one or more computing devices 400b, cluster storage arrays 410b, and cluster routers 411b, connected together by local cluster network 412b. Likewise, computing cluster 409c can include one or more computing devices 400c, cluster storage arrays 410c, and cluster routers 411c, connected together by a local cluster network 412c.

In some embodiments, each of computing clusters 409a, 409b, and 409c can have an equal number of computing devices, an equal number of cluster storage arrays, and an equal number of cluster routers. In other embodiments, however, some or all of computing clusters 409a, 409b, and 409c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

Cluster storage arrays 410a, 410b, and 410c of computing clusters 409a, 409b, and 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

The cluster routers 411a, 411b, and 411c in the computing clusters 409a, 409b, and 409c can include networking equipment configured to provide internal and external communications for the computing clusters. For example, the cluster routers 411a in the computing cluster 409a can include one or more internet switching and/or routing devices configured to provide (i) local area network communications between the computing devices 400a and the cluster storage arrays 401a via the local cluster network 412a, and/or (ii) wide area network communications between the computing cluster 409a and the computing clusters 409b and 409c via the wide area network connection 413a to the network 406. The cluster routers 411b and 411c can include network equipment similar to the cluster routers 411a, and the cluster routers 411b and 411c can perform similar networking functions for the computing clusters 409b and 409b that the cluster routers 411a perform for the computing cluster 409a.

3. Stabilizing Color-Sequential Display Images by Correcting for Eye Movement

A color-sequential display (CSD) is a form of video display in which color sub-frames of each video frame are displayed in a temporal sequence, at a rate sufficiently high that a viewer's brain may perceive all color sub-frames of each frame as appearing effectively at the same time. As a result, the viewer's brain may tend to merge the color sub-frames, leading to a perception of a fully, color-integrated visual rendering of each frame. Perception of proper merging of color sub-frames may depend, at least in part, on each color sub-frame of each given frame appearing at a common visual location within the viewer's field of view. In conventional operation of a CSD, the color sub-frames of each given frame are displayed at a common location on the CSD. Consequently, the visual locations within the viewer's field of view of color sub-frames may appear to change if the viewer's eyes are moving with respect to the CSD. If the changing position in the field of view is sufficiently rapid, color merging may, as a result, appear distorted or unstable.

In systems or devices that employ CSDs, eye motion that is rapid enough to give rise to perceived color distortion can occur in various circumstances, and be sensitive in varying degrees to the physical configuration of the system or device. For example, the physical configuration of a system or device may tend to cause angular displacements of an eye (or eyes) with respect to a CSD to translate into large linear (path) displacements on a display plane of the CSD. This, in turn, can amplify an effective speed of linear motion in the display plane.

A head-mounted display, such as the wearable computing systems illustrated in FIGS. 1a-1d, is an example of a system for which such rapid eye-motion effects may occur. This is because the display element(s) of a HMD may be configured close to the eye(s) of the user—on the order of a few to tens of millimeters. In such a geometry, small angular motions of the eyes can correspond to motions projected on the display plane that are large in the context of the display plane. Note that, depending on the particular physical configuration the HMD, the CSD may not be physically in the field of view, but rather its images may be transported into the field of view, and it may be the elements that display the transported images (e.g., lens elements 110 and 112 in FIG. 1b) that are positioned close to the user's eye(s). In this case, the display plane of the CSD may be considered as being positioned virtually in the field of view of the user. Nevertheless the display plane of the CSD may be considered as being virtually close to the user's eye(s), and motions of the eye(s) may be considered as being projected virtually onto the display plane.

The source of rapid eye movement with respect to a CSD of a HMD could be deliberate eye movement of the user, for example as the user peruses field of view. Alternatively and/or additionally, movement could be unintentional, for example due to bouncing or vibrational movement of the HMD on the user's head caused by bouncing or vibration of the user's head. For example, the user may be riding a subway or chewing crunchy food. Note that bouncing or vibrational motion are also examples of motion that may have translational components between the eye(s) and the CSD along any or all of three dimensions. Such motions might then be added to any relative angular displacements.

In accordance with example embodiments, image stabilization of color sequential displays (CSDs) may be implemented in a wearable computing device that is configured with an eye-tracking device. Measurements from the eye-tracking device may be used to adjust the relative positions of successive color sub-frames on the CSD, and thereby compensate for eye movement relative to the CSD. A HMD, such as any one or all of those illustrated in FIGS. 1a-1d, is an example of a wearable computing device for implementation. Example embodiments may be described in terms of example operation, example methods, and example non-transitory computer-readable media having stored thereon computer-executable instructions of an example method. For purposes of illustration, the HMD may be taken as being worn by a representative user, and the eye-tracking device may be considered as tracking eye movement of the representative user.

It will be appreciated that the relative motion between the eye(s) and the CSD described herein by way of example for a HMD could arise in other systems and circumstances as well. Accordingly, various principles of the embodiments discussed herein may be applicable in those other systems and circumstances, and are not necessarily limited to application in HMD embodiments. It should be understood that implementation of image stabilization of CSDs is not limited to wearable computing devices, and that embodiments involving implementation in other types of systems or devices that include one or more CSDs and one or more eye-tracking devices are possible as well. Moreover, while the rapid temporal sequencing of color sub-frames of a CSD is referenced to perceptual processing by a viewer's (i.e., user's) brain, it will be appreciated that the principles may be applied to any detection system (animal or machine) for which color merging of color sub-frames involves detection of all temporally-sequenced color sub-frames of a given frame within a time interval specified to accommodate an effective merging process within an operational context of the detection system.

a. Example Operation of a Color-Sequential Display

Figure 5:
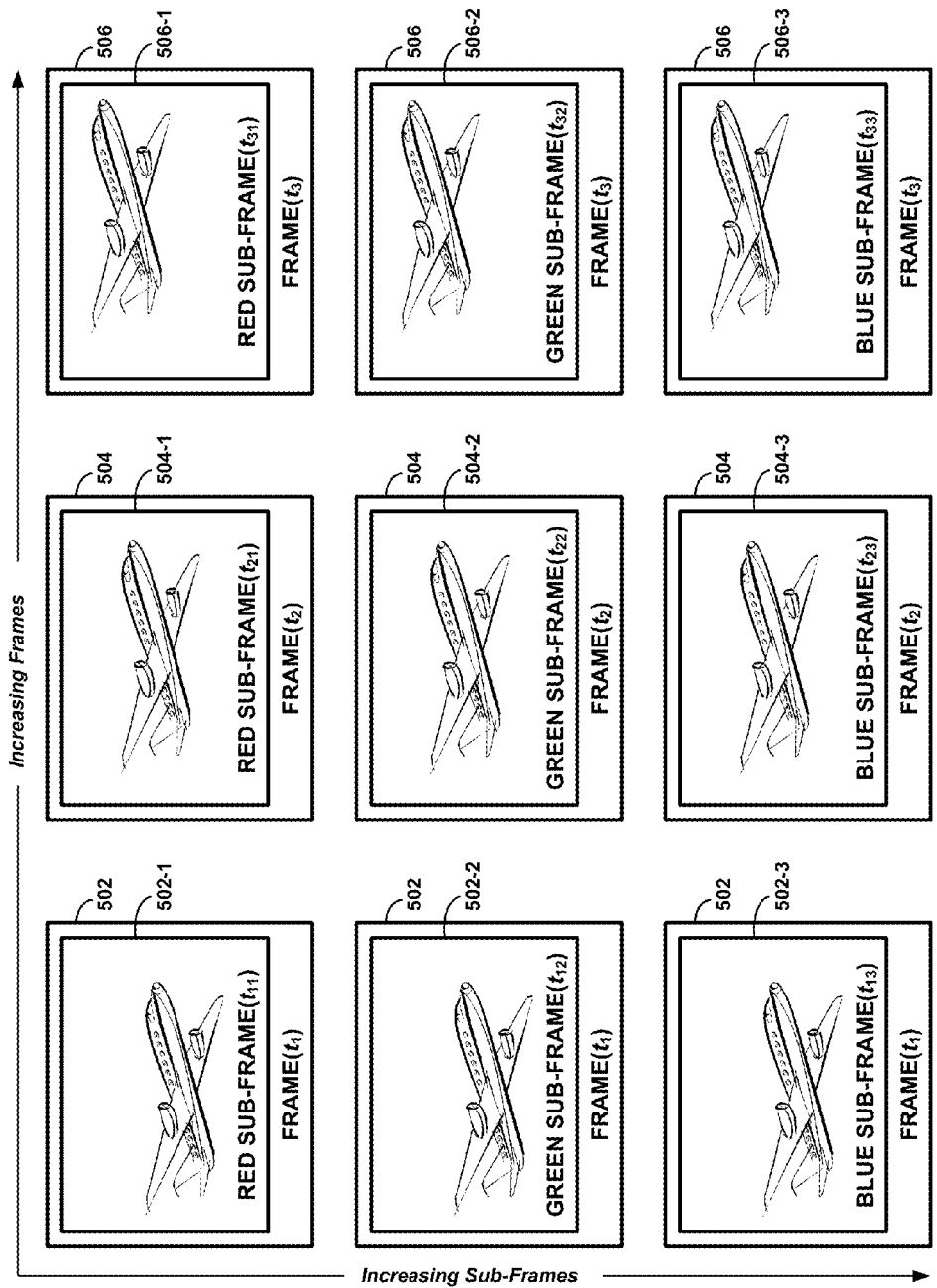
FIG. 5 depicts an example of displaying frames and color sub-frames of a color-sequential display, in accordance with an example embodiment.

FIG. 5 is a conceptual illustration of operation of a CSD, according to example embodiments. By way of example, three video display frames 502, 504, and 506 are depicted as columns of color sub-frames at the left, center, and right of the FIG. 5. Each frame includes three color sub-frames—a red, a green, and a blue color sub-frame—which are arranged vertically within the respective column of each frame. As indicated, frame number (and frame time) increases from left to right in the figure, and color sub-frame number (and color sub-frame time) increases from top to bottom. The time from one frame to the next is $\Delta t_{fr}$, and is referred to herein as the "inter-frame time" or "frame period." The inverse of $\Delta t_{fr}$ is the "frame frequency" or "frame rate," and is denoted $F_{fr}$. Similarly, the time from one color sub-frame to the next is $\Delta t_{sub-fr}$, and is referred to herein as the "inter-sub-frame time" or "sub-frame period." The inverse of $\Delta t_{sub-fr}$ is the "sub-frame frequency" or "sub-frame rate," and is denoted $F_{sub-fr}$.

A typical frame rate for a CSD for a human viewer might be in a range of 60-75 Hz (frames per second). For such a system, the sub-frame rate would be in a range of 180-225 Hz. That is, the sub-frame rate is usually three times the frame rate, assuming three color sub-frames per frame (e.g., red, green, and blue). It will be appreciated that other frame and sub-frame rates could be used.

For purposes of illustration in FIG. 5, the frames and color sub-frames depict an airplane that appears to be ascending as the frames increase. The depiction of movement is simply a visual cue to signify display of a moving video image for convenience in the present discussion. It will be appreciated that example embodiments are not limited to operation of video displays of moving objects or entities, and may include displaying still objects in a CSD as well (e.g., display of a fixed or episodically-changing image, such as a still photograph or a text document).

By way of example, the frame 502 is displayed at time $t_1$. In operation, the red sub-frame 502-1 of the frame 502 is displayed first at time $t_{11}=t_1$. This is followed by the green sub-frame 502-2 at time $t_{12}=t_{11}+\Delta t_{sub-fr}$, and the blue sub-frame 502-3 at time $t_{13}=t_{12}+\Delta t_{sub-fr}$. The position of the airplane in the three color sub-frames 502-1, 502-2, and 502-3 is the same, indicating each color sub-frame represents the same image with respect to frame time $t_1$. However, the three color sub-frames are displayed at incremental sub-frame times. In practice, the time interval from $t_{11}$ through $t_{13}$ is sufficiently short (or equivalently, $F_{sub-fr}$ is sufficiently large) that, although the color sub-frames are displayed in a temporal sequence, the three sub-frame images are perceived by the user as merged into a single, full-color image of the frame 502 at a single time roughly coinciding with sub-frame time $t_{13}$ (i.e., a time by which all three color sub-frames have been displayed).

Note that while $t_1$ technically coincides with $t_{11}$, $t_1$ can also be considered more loosely as marking the display time of the entirety of the frame 502, with the understanding the entirety of the frame includes all of its temporally sequential color sub-frames. This comment applies to other frames and display times as well (e.g., frames 504 and 506 and times $t_2$ and $t_3$, discussed below).

The next frame 504 is displayed at time $t_2$, which in practice follows sub-frame time $t_{13}$ by an amount equal to the sub-frame period. In operation, the red sub-frame 504-1 of the frame 504 is displayed first at time $t_{21}=t_2$, followed by the green sub-frame 504-2 at time $t_{22}=t_{21}+\Delta t_{sub-fr}$, and the blue sub-frame 504-3 at time $t_{23}=t_{22}+\Delta t_{sub-fr}$. The position of the airplane is evidently higher than in the previous sub-frame 502, but is again the same in the three color sub-frames 504-1, 504-2, and 504-3, indicating each color sub-frame represents the same image with respect to frame time $t_2$. As with the previous frame 502, the three color sub-frames are displayed at incremental sub-frame times. Again, the three sub-frame images are perceived by the user as merged into a single, full-color image of the frame 504 at a single time roughly coinciding with sub-frame time $t_{23}$.

The next frame 506 is displayed at time $t_3$, which in practice follows sub-frame time $t_{23}$ by an amount equal to the sub-frame period. In operation, the red sub-frame 506-1 of the frame 506 is displayed first at time $t_{31}=t_3$, followed by the green sub-frame 506-2 at time $t_{32}=t_{31}+\Delta t_{sub-fr}$, and the blue sub-frame 506-3 at time $t_{33}=t_{32}+\Delta t_{sub-fr}$. The position of the airplane is now higher than in the previous sub-frame 504, but is again the same in the three color sub-frames 506-1, 506-2, and 506-3, indicating each color sub-frame represents the same image with respect to frame time $t_3$. As with the previous frame 504, the three color sub-frames are displayed at incremental sub-frame times. Again, the three sub-frame images are perceived by the user as merged into a single, full-color image of the frame 506 at a single time roughly coinciding with sub-frame time $t_{33}$.

The sequential display process illustrated by the three frames 502, 504, and 506, and their respective color sub-frames continues for subsequent frames and color sub-frames, at least while a video image continues to be presented on the CSD. In conventional operation of a CSD, the three color sub-frames of each given frame are displayed at the same physical location of the display. More specifically, the display of a CSD is typically constructed of a pixel array. Thus, all color sub-frames of a given frame are aligned with the same pixels.

In the absence of relative eye motion with respect to the CSD, the color sub-frames of each given frame overlay each other such that the image in each color sub-frame is perceived at the same position in the field of view; i.e., at the same pixel location. Consequently, the sequential colors of each pixel are perceived as being properly merged, and the image appears stable. However, if there is eye movement over the time interval between color sub-frames (i.e., over $\Delta t_{sub-fr}$), the pixels within a frame can appear to become misaligned as the user can perceive that colors from different parts of the image are merged. The result can be perceived as a color distortion or an unstable image.

Figure 6:
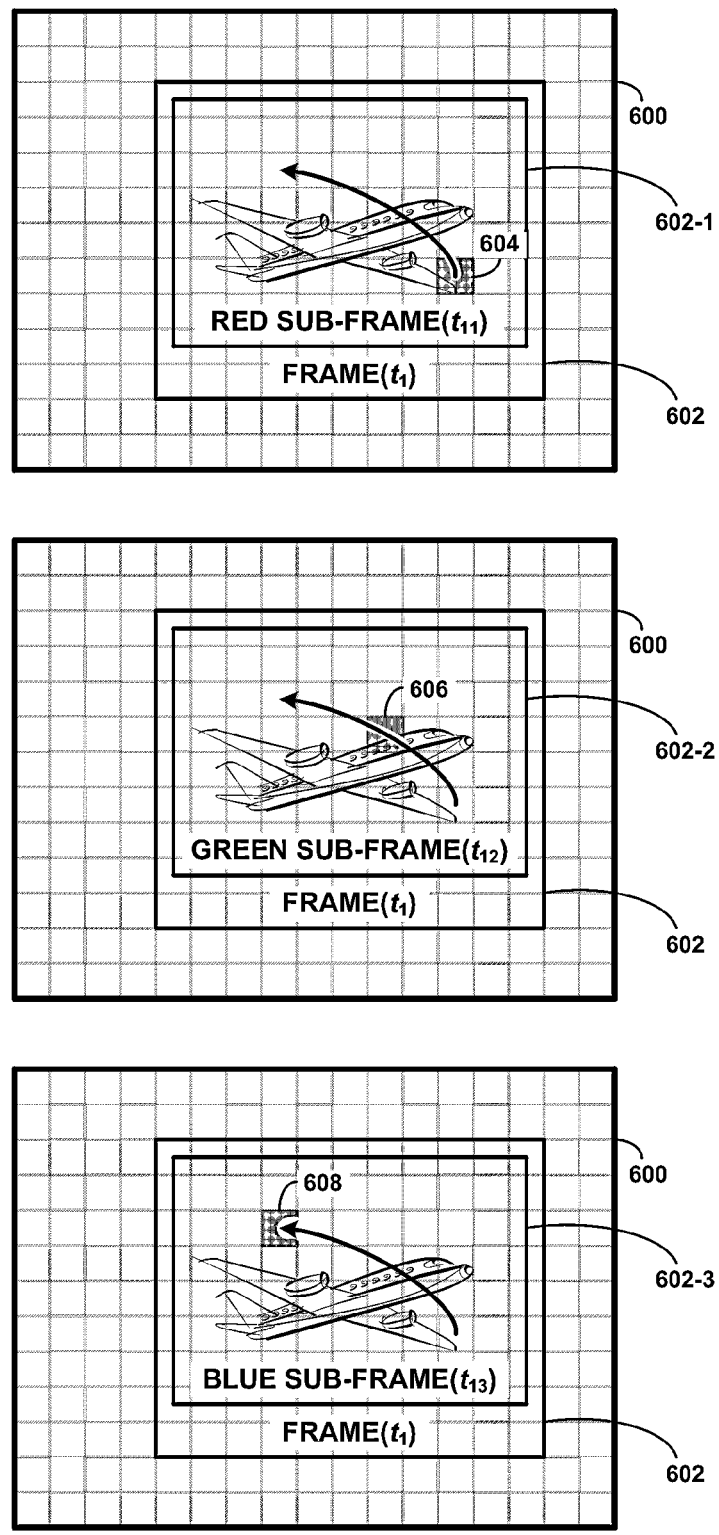
FIG. 6 depicts a conceptual illustration of an example correspondence of pixels of a color-sequential display to sub-frame image in the presence of eye motion, in accordance with an example embodiment.

The effect of eye movement on perceived sub-frame misalignment is illustrated conceptually in FIG. 6, which depicts a video frame 602 at time $t_1$, and three color sub-frames 602-1, 602-2, and 602-3 of the frame 602 at times $t_{11}$, $t_{12}$, and $t_{13}$, respectively. The frame 602 and its color sub-frames are displayed on a CSD pixel array 600, represented by a rectangular grid. For purposes of illustration, the size of the pixels (squares of the grid) compared with image displayed is exaggerated in order to better explain the effect of eye movement. It will be appreciated that actual pixels can typically be significantly smaller (and the image resolution higher) than the representative ones shown (e.g., by a factor or 100 or more). Also for purposes of illustration, the frame 602 is depicted as being smaller than the pixel array 600. In practice, a video frame may fill or nearly fill an entire pixel array of a display. By way of example, the same airplane image shown in FIG. 5 is repeated in FIG. 6.

Eye movement with respect to the pixel array 600 of the CSD may be characterized as linear movement across the pixel array resulting from angular movement of a "gaze direction" of an eye. Gaze direction, in turn, is typically taken to be a pointing direction at the center of the field-of-view of the eye. Operationally, gaze direction can be considered to be the pointing direction of the pupil of the eye, and may be determined by an eye-tracking device according to known techniques. As the gaze direction changes, the intersection of the gaze direction with the pixel array sweeps out an "eye-gaze path" across the pixel array. Determination of eye-gaze path based on eye tracking is discussed in more detail below. However, the example in FIG. 6 is concerned with the effect of an eye-gaze path on conventional CSD operation, regardless of whether the eye-gaze path is actually measured, detected, or predicted.

For eye movement that occurs on a time scale comparable to or shorter than $\Delta t_{sub-fr}$, the gaze direction of the eye can intersect a different pixel at the each respective display time of the R, G, and B sub-frames of a given frame. This is illustrated in FIG. 6 by the depiction of the eye-gaze path as a heavy curved arrow pointing from the pixel 604 in the color sub-frame 602-1, through the pixel 606 in the color sub-frame 602-2, to the pixel 608 in the color sub-frame 602-3. Similarly to the example pixel size, the length of the motion path shown may also be considered as exaggerated compared with the image size for purposes of illustration. However, while movement of just one or a few pixels over $\Delta t_{sub-fr}$ might be more realistic, there is no loss in generality by considering the illustrated exaggerated motion path as shown.

The mis-alignment of colors can be understood as follows. At time $t_{11}$, the pixel 604 displays the R sub-frame color for a portion of the image just below the "nose" of the airplane. For properly perceived color merging, the same image portion—i.e., pixel 604—should be viewed as displaying the G and B sub-frame colors as well. However, due to eye movement, the gaze direction of the eye is evidently pointing at the pixel 606 at time $t_{12}$ of the G sub-frame, and at the pixel 608 at time $t_{13}$ of the B sub-frame. The result can be a perceived merging of colors from three different portions of the image, instead from the same portion, leading to perceived color distortion or an unstable image.

The effect of eye movement on perceived sub-frame misalignment can also be understood by considering a correlation between eye gaze direction and image detection by the retina of the eye. Geometrically, the field-of-view corresponds to an opening cone having the gaze direction as its axis. Within the opening cone, any specific directed ray (including the gaze direction) will come to be focused on a fixed portion of the retina of the eye, regardless of the angular orientation of the eye. However, as the gaze direction changes, the location within the field-of-view of an object in space will also tend to change. In particular, the object will be viewed along different directed rays within the opening cone. Consequently, the object will tend to be focused on different portions of the retina as the gaze direction changes.

Figure 7:
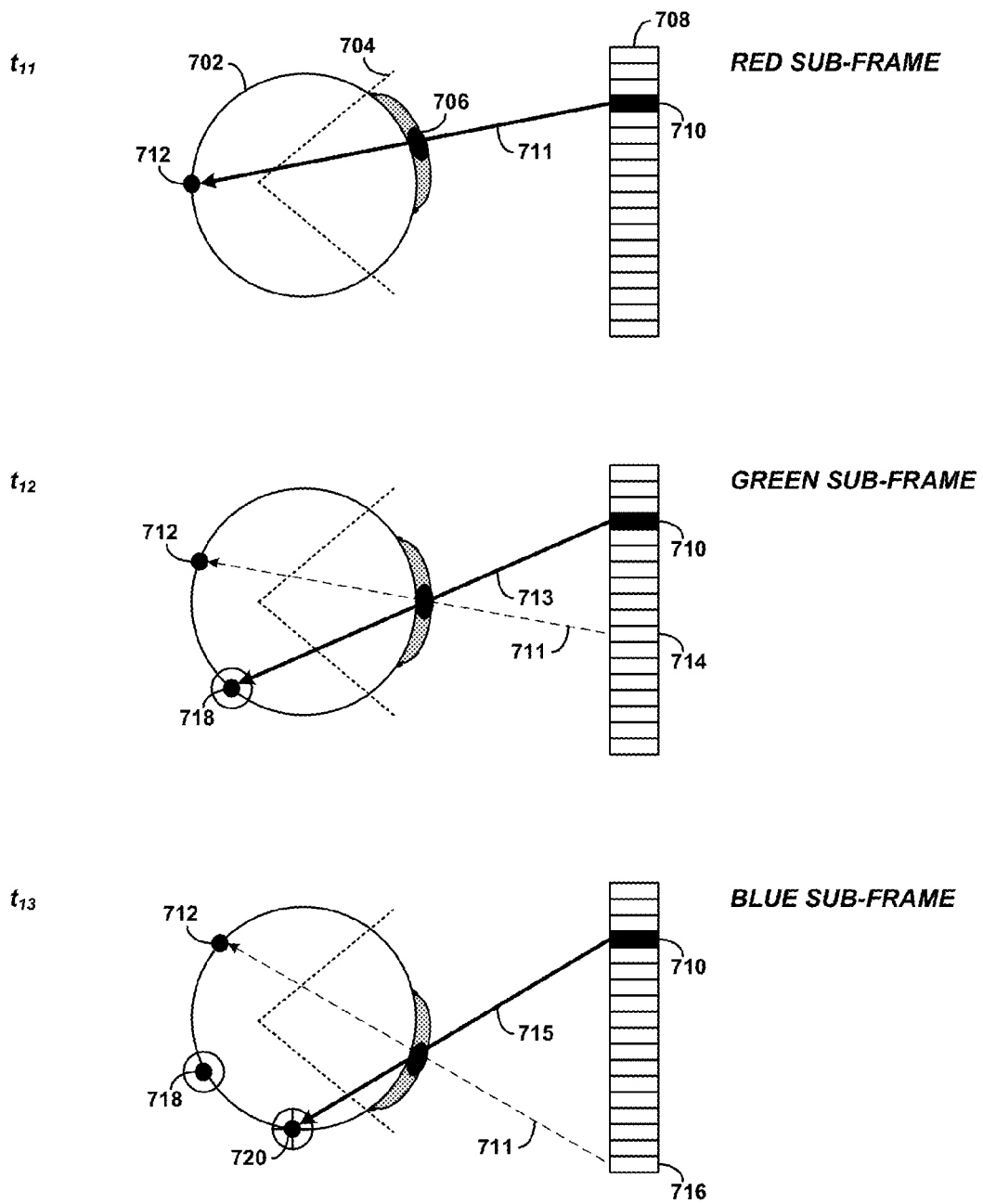
FIG. 7 depicts a conceptual illustration of projected positions on an eye (e.g., on a retina of an eye) of a pixel of a color-sequential display in the presence of eye motion, in accordance with an example embodiment.

FIG. 7 illustrates the concept of how eye movement can cause a pixel to be projected on different locations on a retina for different color sub-frames of a given CSD frame, and thereby lead to perceived color distortion of a video image in the CSD. The figure shows an eye 702 at three different angular orientations with respect to a pixel array 708, at times $t_{11}$, $t_{12}$, and $t_{12}$, of red, green, and blue sub-frames, respectively. The pixel array 708 is taken to symbolically represent a CSD-equipped system, such as a HMD illustrated in FIGS. 1a-11d. For purposes of illustration, just one dimension of the eye 702 and the pixel array 708 is shown in a vertical side view. The angular orientation of the eye is represented by an angular position of a pupil 706 with respect to an eyelid 704. Again, pixel sizes and eye movement are depicted in what may be considered exaggerated form for purposes of illustration. Similarly, the size range of the angles depicted, and the implied angular size of the opening cone of the field of view, may also be considered as exaggerated for purposes of illustration.

At time $t_{11}$ (top of FIG. 7), the eye 702 is directed at an upward angle, toward a pixel 710 of the pixel array 708. The pixel 710 is viewed by the eye 702 along a directed ray 711, and comes to be focused at position 712 on the back (retina) of the eye. It will be appreciated that the effect of the lens of the eye on the focusing optics is omitted from the present discussion. However, this simplification leads to no loss in generality with respect to the explanation herein of the effect of eye movement on perceived color merging.

At time $t_{12}$ (middle of FIG. 7), the eye 702 is directed approximately horizontally, toward a pixel 714 of the pixel array 708. In this orientation, it is the pixel 714 that is viewed along the directed ray 711 (redrawn as a thin, dotted arrow) and focused at the position 712 on the retina. The pixel 710 of the pixel array is now viewed by the eye 702 along a directed ray 713, and comes to be focused at position 718 on the retina. As can be seen, position 718 is different than position 712.

At time $t_{13}$ (bottom of FIG. 7), the eye 702 is directed at a downward angle, toward a pixel 716 of the pixel array 708. In this orientation, it is the pixel 716 that is viewed along the directed ray 711 (redrawn as a thin, dotted arrow) and focused at the position 712 on the retina. The pixel 710 of the pixel array is now viewed by the eye 702 along a directed ray 715, and comes to be focused at position 720 on the retina. As can be seen, position 720 is different than both positions 712 and 718. As a visual cue, a different symbol marks each of the three positions 712, 718, and 720.

Because the pixel 710 is detected by different portions of the retina for each of the R, G, and B sub-frames, the three colors are not perceived as being merged properly if the eye movement show occurs on a time scale comparable to or faster than $\Delta t_{sub-fr}$. Rather, the brain will tend to merge three the R, G, and B colors of three different pixels. Namely pixel 710 at time $t_{11}$, pixel 714 at time $t_{12}$, and pixel 716 at $t_{13}$. As discussed above, the result can be perceived color distortion. It will be appreciated that the one-dimensional representation of FIG. 7 can be generalized to a two-dimensional description as well.

b. Example Operation of Image Stabilization of Color-Sequential Displays

In accordance with example embodiments, a system may include both a CSD and an eye-tracking device. The eye-tracking device can be used to measure in real time the motion of an eye (or eyes) viewing the CSD, and the measured eye motion can be used to adjust in real time the relative positions of color sub-frames on a CSD so as to eliminate or reduce perceived color distortion that would otherwise result from the eye motion. More particularly, real-time eye tracking may be used to predict a path of eye motion in the plane of a CSD at a rate that is fast enough to adjust the position of an upcoming color sub-frame so that it appears to the moving eye(s) not to have moved with respect to the gaze direction of the eye(s) at the previous color sub-frame. In this way, eye tracking can be used to compensate for eye motion that might otherwise cause perceived color distortion or unstable imaging.

In accordance with example embodiments, the system may be a wearable, HMD equipped with one or more CSDs and one or more eye-tracking devices, such as the HMD illustrated in FIGS. 1a-1d. Images generated by the CSD may be made to appear within the field of view of the HMD. For example, referring again to FIG. 1b, projectors 128 and 130 may project images from one or more CSDs onto lens elements 110 and 112 so as to make video images of the CSD(s) to appear in a "video viewing area" that coincides, at least in part, with the field of view of the lens elements 110 and 112. For example, light from the CSD(s) could be coupled to, and transmitted via, an optical waveguide that reflects the images in a viewing direction. Other techniques could be used as well.

As noted above, in a projector-based display system, the display plane of the CSD may be made to appear virtually in the video viewing area, while the physical CSD may actually be located at a different location on the HMD. It should also be noted that the term "projected" is used herein in two different ways. Specifically, the description of an image being "projected" onto the video viewing area (e.g., lens elements) refers to a physical process of transporting light (e.g., via a waveguide) from an image-generating display element to the video viewing area, where the transported light then gives rise to the appearance of the generated image. The description of gaze direction (or eye movement) being "projected" onto the CSD display plane refers to a conceptual, geometric operation for specifying a path of intersection of gaze direction with the CSD display plane. Which one of the two meanings of "projected" is intended should be clear from the context in which it is used.

The eye-tracking device of the HMD could include one or more eye-tracking cameras configured in a fixed position with respect to the lens elements 110 and 112, and could be capable of tracking in real time the gaze direction of the eye(s) of a user of the HMD. More specifically, the eye-tracking cameras could measure eye movement by capturing video images of a user's eyes in successively-acquired video frames, which collectively form an "eye-tracking signal." The video frames (or eye-tracking signal) could be analyzed, using known techniques for example, to yield frame-by-frame tracking of the pupils of the eyes as observed by the eye-tracking cameras. By applying the known spatial (geometric) relation between the eye-tracking cameras and the lens elements 110 and 112, the eye-tracking of the pupils can be analytically converted into gaze direction of the eyes as projected onto the video viewing area. By further applying a known geometric relation between the CSD display plane and video viewing area, the gaze direction of the eyes as projected onto the video viewing area may be analytically converted into gaze direction as projected (possibly virtually) onto the CSD display plane.

In further accordance with example embodiments, the frame rate of the eye-tracking cameras, $F_{tracking}$, may be made large enough compared with the sub-frame rate $F_{sub-fr}$ of the CSD, so as to enable predicting the path of eye movement in the display plane of the CSD at a rate faster than $F_{sub-fr}$. By way of example, taking $F_{tracking}=4 \times F_{sub-fr}$, the eye-tracking device could acquire three eye-tracking video frames in the time $\Delta t_{sub-fr}$ between each color sub-frame. By analyzing these three eye-tracking video frames, acquired at or since a given color sub-frame, the eye-tracking device (or a processor of the HMD, for example), could determine a predicted location that the gaze direction will have in the display plane of the CSD at the future time of the next color sub-frame following the given color sub-frame. Then by adjusting the display position of the next color sub-frame to "follow" the path of eye movement to the predicted location, the next color sub-frame can be made to appear at the same position relative to the eye gaze direction as the given color sub-frame. Since the next color sub-frame will appear not to have moved relative to given color sub-frame, color merging of the two sub-frames may be perceived as undistorted. By applying this eye-tracking-based adjustment to the relative positions of all color sub-frames of each frame, undistorted color merging can be perceived on a continuous basis, and image stabilization achieved.

The example of $F_{tracking}=4 \times F_{sub-fr}$ provides a very simple illustration of how sufficiently fast eye tracking may be used to predict the path of eye movement in the display plane of the CSD. In accordance with example embodiments, other rates of eye-tracking frame capture could be used to predict movement (e.g., $F_{tracking}=8 \times F_{sub-fr}$), and various models of eye movement in the display plane could be devised and employed for image stabilization. For example, a historical record of gaze direction could be maintained as part of an analytic predictive model for extrapolating gaze direction projected in the display plane. Extrapolation could then be used to predict the path of movement, and the predicted movement used to continually adjust the positions of color sub-frames in the display plane of the CSD. Predictive models could range in complexity from simple linear extrapolation based directly on measured eye gaze directions in eye-tracking video frames, to time-series analyses that apply measured eye gaze directions to models for pre-determined eye-movement behavior or activities such as reading or video game interaction, to more complex statistical models (e.g., hidden Markov models) of eye movement, to mention just three examples.

In further accordance with example embodiments, various predictive techniques, such as the examples above, could be implemented as computer-executable instructions (e.g., software, firmware, etc.) stored in one or another form of memory of the HMD (and/or the eye-tracking device), and executed by one or more processors of the HMD (and/or the eye-tracking device). In addition, a selection of which predictive technique is applied at any given time could be determined by the HMD based user input, sensor data, analysis of an eye-tracking signal, or some other (or additional) form of context-specific information. For example, if a text-display application is invoked, a reading predictive model might be employed. If a motion detector of the HMD (e.g., part of sensor 122 in FIG. 1a) detects vibrational motion, a model for vibrational motion might be employed that uses motion data from the motion detector in addition to, or in place of, eye-tracking data. If sweeping eye motions are detected in the eye-tracking signal, a linear model might be employed. These are just a few examples. Moreover, if multiple sources of eye movement are detected or determined, the prediction of eye movement in the display plane of the CSD could combine aspects of more than one model or predictive technique to achieve a more refined and/or accurate prediction than any one technique alone might provide.

Figure 8:
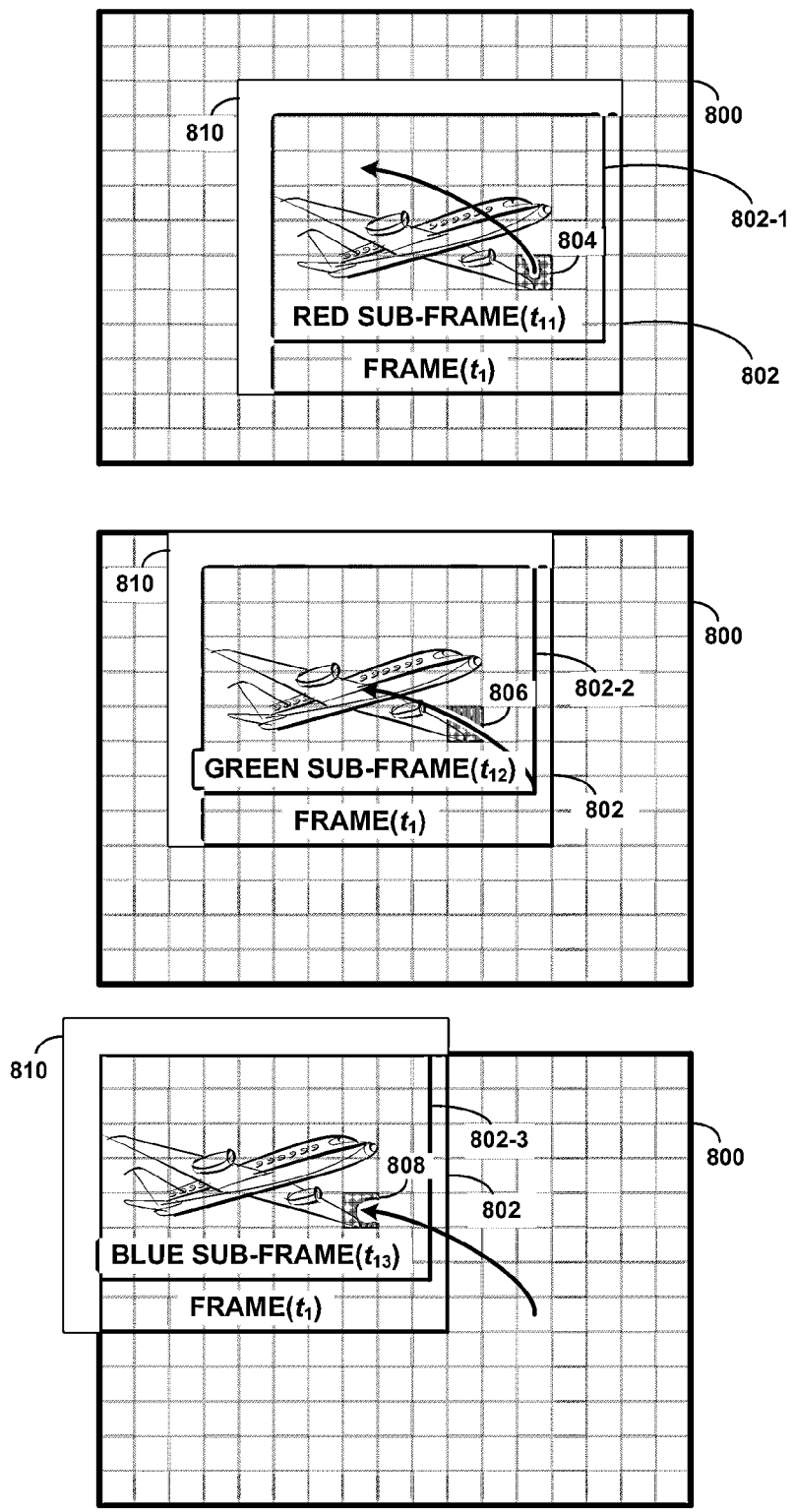
FIG. 8 depicts a conceptual illustration of an example application of eye-motion compensation to correspondence of pixels of a color-sequential display to sub-frame image, in accordance with an example embodiment.

FIG. 8 is a conceptual illustration of operation eye-tracking-based image stabilization in a CSD, according to example embodiments. Similarly to the example in FIG. 6, FIG. 8 depicts a video frame 802 at time $t_1$, and three color sub-frames 802-1, 802-2, and 802-3 of the frame 802 at times $t_{11}$, $t_{12}$, and $t_{13}$, respectively. The frame 802 and its color sub-frames are displayed on a pixel array 800, represented by a rectangular grid. Again, the size of the pixels (squares of the grid) compared with image displayed is exaggerated for purpose of illustration, and the frame 802 is depicted as being smaller than the pixel array 800. The same airplane image shown in FIG. 5 and FIG. 6 is used once more in this example.

As in FIG. 6, an eye-gaze path is depicted as a heavy curved arrow pointing from the pixel 804 in the color sub-frame 802-1, through the pixel 806 in the color sub-frame 802-2, to the pixel 808 in the color sub-frame 802-3. In the illustration in FIG. 8, the eye-gaze path may be taken to represent a path determined by one or another of the eye-tracking techniques described above. Thus, in accordance with example embodiments, the traversal of pixel 804 by the eye-gaze path may be predicted prior to time $t_{11}$. Similarly the traversal of pixel 806 by the eye-gaze path may be predicted prior to time $t_{12}$, and the traversal of pixel 808 by the eye-gaze path may be predicted prior to time $t_{13}$.

Also in accordance with example embodiments, the display position of the sub-frames within the pixel array 800 may be adjusted to compensate for the eye motion represented by the eye-gaze path. Specifically, the position of the G sub-frame is offset with respect the R sub-frame by an amount equal to the shift from pixel 804 to pixel 806. Similarly, the position of the B sub-frame is offset with respect the G sub-frame by an amount equal to the shift from pixel 806 to pixel 808. Because each of the shifts is known prior to display of the next color sub-frame, the display offsets can be applied in real time. The display offsets, in turn, keep the image in each respective sub-frame at the same position with respect to the eye-gaze direction at the time of the respective sub-frame. Consequently, the merging of the three color sub-frames may be perceive without distortion, and a stable image maintained.

The effect of adjusting the sub-frame positions may be further understood by considering the positions of the pixels 804, 806, and 808 relative to the image of the airplane in each sub-frame. Specifically, even though pixels 804, 806, and 808 are at different locations within the pixel array 800, each has the same location within the image of the airplane—namely, just below the "nose" of the airplane for this example. This is because the pixels 804, 806, and 808 follow the eye movement across the pixel array 800. Consequently, the proper sequence of R, G, and B color values for the indicated location within the image (i.e., below the "nose" of the airplane in this example) will be displayed as the sub-frames follow the eye movement across the pixel array 800. Hence, the merging of the colors of the pixels 804, 806, and 808 is perceived as undistorted. The same principle applies to the entire image, so that the entire image of the frame 802 is perceived as being undistorted and stable.

While the FIG. 8 illustrates eye-tracking-based image stabilization for the three color sub-frames of example frame 802, it should be understood that the process represented in FIG. 8 may be continuously applied for the temporal sequence of color sub-frames of each temporally-sequential frame. Thus, the starting position in the pixel array 800 of the first color sub-frame of a given frame may be offset from that of the last color sub-frame of the immediately preceding frame. In this way, the offset between the end of one frame (i.e., the last color sub-frame) and the start of the next frame (i.e., first color sub-frame) may be determined in the same manner as the offset between color sub-frames of any given frame.

While offsetting sequential sub-frames can reduce or eliminate color distortion caused by eye motion relative the display plane of a CSD, it can also cause a portion of one or more sub-frames to be shift beyond the pixel array, so that they become truncated—i.e., sub-frame portions not displayed at all. The image portion within such truncated portion of the sub-frame can then appear color-distorted because not all colors of that image portion will be displayed. For example, if an offset causes a horizontal top border of a B sub-frame to shift off the top of the pixel array by an amount equal to two pixel heights at time $t_{13}$, then the frame displayed at time $t_1$ will be missing all the B colors along a horizontal, two-pixel-high strip at the top of the image.

In accordance with example embodiments, color distortion caused by a shifting of sub-frames of a given frame beyond the pixel array of a CSD can be masked or hidden from view by predictively cropping the sub-frames of the given frame such that no portion of the given frame includes a truncated portion of any one of the sub-frames. More specifically, the same location prediction that is used to determine the relative offset of each sub-frame of a given frame can also be used to predict which, if any, portions of any sub-frame will become truncated by being shifted beyond the pixel array. This information can then be used to crop a common portion of all of the sub-frames of the given frame, where the common portion corresponds to the portion of any sub-frame that will become truncated by the shifting operation. Portions of sub-frames that might otherwise be completely displayed could be cropped, but these portions would be displayed with incomplete colors in the absence of cropping. The result may appear as dark or blackened border surrounding displayed images that masks or hides regions that could be perceived with distorted colors.

An example of cropping can be illustrated with reference again to FIG. 8. By way of example, the image-stabilization offset of the B sub-frame 802-3 at time $t_{13}$ cause it to be shifted above and to the left of the pixel array 800 by one pixel in each direction. Consequently, this portion of the B sub-frame 802-3 will not be displayed. Further, even though neither of the R or G sub-frames 802-1 and 802-2 will be shifted off of the pixel array 800 in this example, the display of the frame 802 will exhibit a portion for which the blue color is missing—namely the portion corresponding to the portion of the B sub-frame 802-3 that shifted off the pixel array 800. However, the size and direction of the offset of the B sub-frame can be used to determine a cropping border 810, prior to display the R, G, and B sub-frames 802-1, 802-2, and 802-3. As illustrated, the cropping border 810 can be applied to all three of the color sub-frames 802-1, 802-2, and 802-3, thereby masking or hiding the portion of the frame 802 in which the blue color will be missing. The effect may be perceived as an image with a cropped edge or border, but one for which no colors are missing or distorted within the border.

The same principle may be applied continuously, so that at the same time that image stabilization (i.e., elimination or reduction of color distortion) is achieved by using eye-tracking to adjust the relative positions of color sub-frames on the CSD, a cropping border is dynamically applied to portions of images that are shifted off the CSD by the offset adjustments. It will be appreciated that the exaggeration of pixel size in FIG. 8, as well as the small example size of the frame 802 relative to the pixel array 800, may tend to exaggerate the apparent effect of the cropping border. In practice, it may be anticipated that the cropping border will more likely be perceived as a relatively thin, dark border surrounding the image. Moreover, the thickness of the border compared with the size of the image may be anticipated as being small enough to appear constant or nearly so (e.g., a one to a few pixels wide), even if it actually grows and shrinks as the offset adjustments are made.

Figure 9:
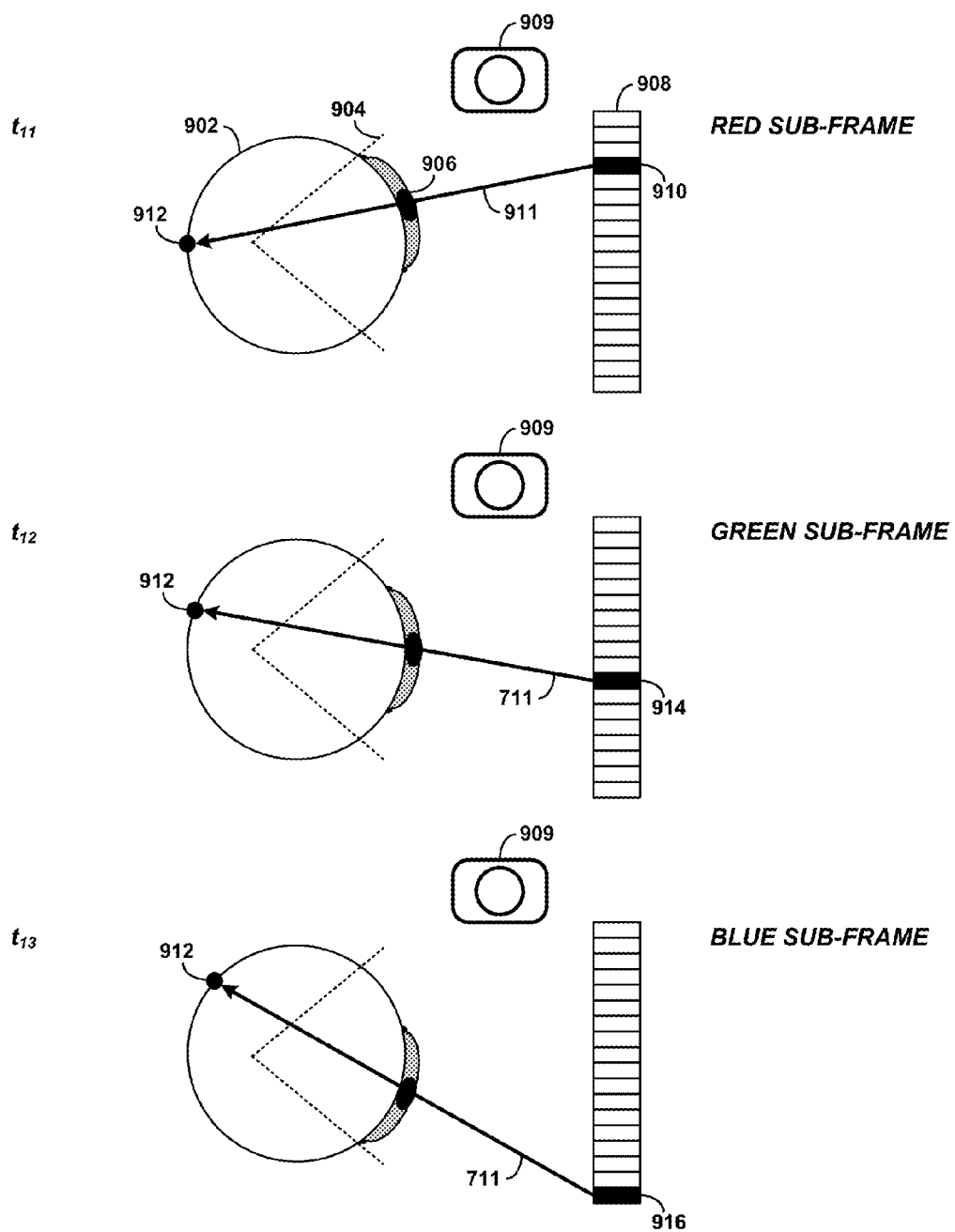
FIG. 9 depicts a conceptual illustration of an example application of eye-motion compensation to projected positions on an eye (e.g., on a retina of an eye) of a pixel of a color-sequential display in the presence of eye motion, in accordance with an example embodiment.

FIG. 9 illustrates the concept of how offset adjustment of color sub-frames can compensate for eye movement and can cause the proper a pixel to be projected on the same location on a retina for different color sub-frames of a given CSD frame, and thereby eliminating or reducing perceived color distortion of a video image in the CSD. Similarly to FIG. 7, FIG. 9 shows an eye 902 at three different angular orientations with respect to a pixel array 908, at times $t_{11}$, $t_{12}$, and $t_{12}$, of red, green, and blue sub-frames, respectively. The pixel array 908 is taken to symbolically represent a CSD-equipped system, such as a HMD illustrated in FIGS. 1a-11d. For purposes, again, of illustration, just one dimension of the eye 902 and the pixel array 908 is shown in a vertical side view. The angular orientation of the eye is represented by an angular position of a pupil 906 with respect to an eyelid 904. Once more, pixel sizes and eye movement are depicted in what may be considered exaggerated form for purposes of illustration, and the size range of the angles depicted, and the implied angular size of the opening cone of the field of view, may also be considered as exaggerated for purposes of illustration.

In FIG. 9, the symbolically-represented system includes an eye-tracking device 909, represented by a cartoon of a camera. The presence of the eye-tracking device 909 serves as a visual cue that eye tracking is being carried out, and the measurements of eye motion obtained used to adjust the relative positions of color sub-frames on the pixel array 908. As such, no structural significance should necessarily be attributed to the form or orientation of the eye-tracking device 909 in the figure.

At time $t_{11}$ (top of FIG. 9) the R sub-frame is being displayed. As shown, the eye 902 is directed at an upward angle, toward a pixel 910 of the pixel array 908. The pixel 910 is viewed by the eye 902 along a directed ray 911, and comes to be focused at position 912 on the back (retina) of the eye. As with the example in FIG. 7, the effect of the lens of the eye on the focusing optics is omitted from the present discussion. Again, however, this simplification leads to no loss in generality with respect to the explanation herein of the effect of eye movement on perceived color merging.

At time $t_{12}$ (middle of FIG. 9), the G sub-frame is being displayed, and the gaze direction has evidently (and by way of example) shifted downward by seven pixels to pixel 914. Using an eye-tracking signal from the eye-tracking device 909 to predict this seven-pixel shift, the G sub-frame may be shifted downward by seven pixels, where the determination to do so precedes $t_{12}$. The green color value displayed at pixel 914 properly corresponds with the red color value displayed at pixel 910 at time $t_{11}$, and because the shift follows the motion of the eye 902, the pixel 914 will be viewed along the directed ray 911 to focus again at the position 912 on the retina.

At time $t_{13}$ (bottom of FIG. 9), the B sub-frame is being displayed, and the gaze direction has evidently (and again by way of example) shifted downward by another seven pixels to pixel 916. Using the eye-tracking signal from the eye-tracking device 909 to predict this additional seven-pixel shift, the B sub-frame may also be shifted downward by seven pixels, where the determination to do so precedes $t_{13}$. The blue color value displayed at pixel 916 properly corresponds with the red color value displayed at pixel 910 at time $t_{11}$ and the green color value displayed at pixel 914 at time $t_{12}$, and, again, because the shift follows the motion of the eye 902, the pixel 916 will also be viewed along the directed ray 911 to focus again at the position 912 on the retina.

Because the pixels 910, 914, and 916 are all detected by same portions of the retina for each of the R, G, and B sub-frames, the three colors are perceived as being merged properly. Accordingly, the brain will tend to merge three the R, G, and B colors of three pixels corresponding to the same position within the image, because the sub-frames have been made to follow the measured eye movement. As a result, color distortion can be eliminated or reduced, and image stabilization achieved. It will be appreciated that the one-dimensional representation of FIG. 9 can be generalized to a two-dimensional description as well.

c. Example Method of Image Stabilization of Color-Sequential Displays

The example embodiments for image stabilization of a color-sequential display described above in operational terms of can be implemented as a method on a wearable HMD equipped with a color-sequential display and an eye-tracking device. The method could also be implemented on a server (or other computing device or platform) external to the HMD. An example embodiment of such a method is described below.

Figure 10:
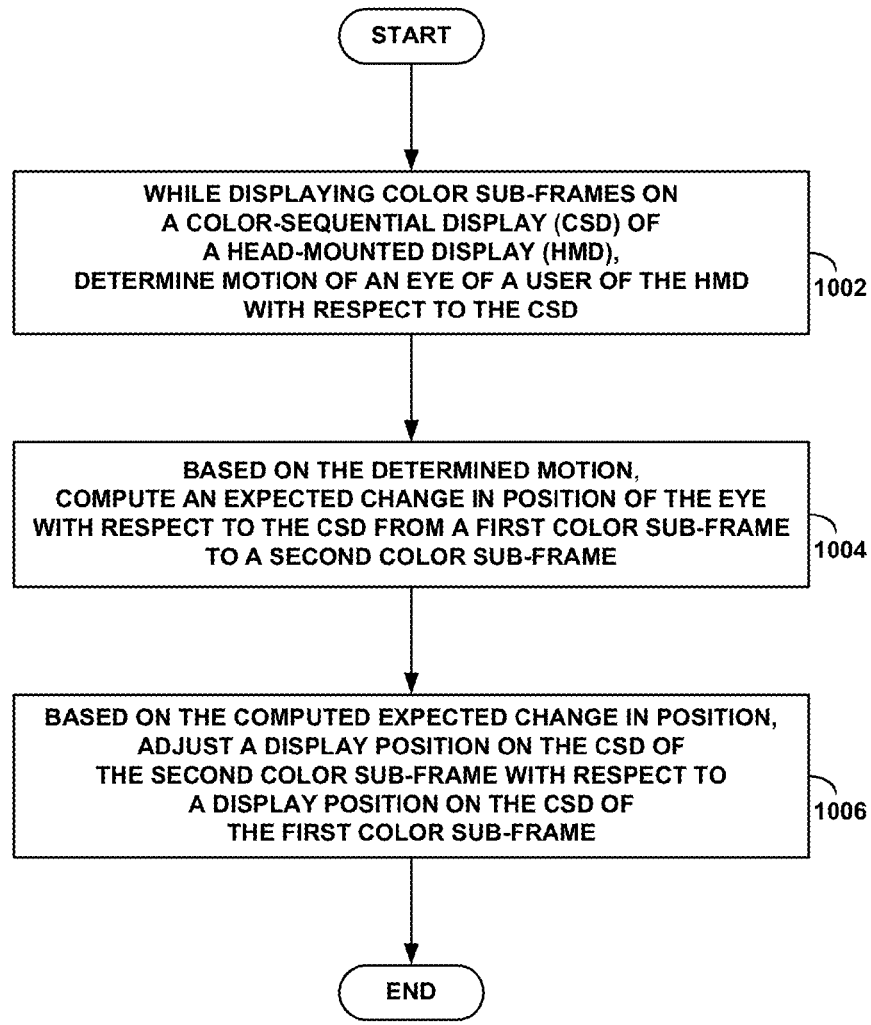
FIG. 10 is a flow chart illustrating a method of image stabilization of a color-sequential display, according to an example embodiment.

FIG. 10 is a flowchart illustrating an example embodiment of a method in a wearable computing system, such as a wearable HMD, for image stabilization of a color-sequential display. The illustrated steps of the flowchart could be implemented in the wearable head-mounted display as executable instructions stored in one or another form of memory, and executed by one or more processors of the wearable head-mounted display. Alternatively, the steps could be carried out in a network server, using eye-tracking data detected and transmitted by a HMD. Examples of a wearable HMD include the wearable computing system 102 in FIGS. 1a-1b and the wearable computing system 202 in FIG. 2. Examples of a network server included the computing devices in FIGS. 4a and 4b. The executable instructions could also be stored on some form of non-transitory tangible computer readable storage medium, such as magnetic or optical disk, or the like, and provided for transfer to the wearable head-mounted display's memory, the server's memory, or some both, during manufacture, configuration, or other procedure(s) used for preparing the wearable head-mounted display and/or the server for operation.

As shown, at step 1002, a wearable HMD with a color sequential display (CSD) determines motion of an eye of a user of the HMD with respect to the CSD, while displaying color sub-frames of a video display image on the CSD. More particularly, the CSC may display a first temporally sequential color sub-frame, followed by a second temporally sequential color sub-frame, followed by a third temporally sequential color sub-frame to a second temporally sequential color sub-frame, and so on. As described above, the time between color sub-frames is the sub-frame period, and the inverse of the sub-frame period is the sub-frame rate.

At step 1004, the wearable HMD computes an expected change in position of the eye with respect to the CSD over a time interval from the first temporally sequential color sub-frame to the second temporally sequential color sub-frame. The computation of the expected change in position of the eye with respect to the CSD is based on the eye motion determined at step 1002, and the time interval is the sub-frame period.

At step 1006, the wearable HMD compensates for the determined motion of the eye by adjusting a display position on the CSD of the second temporally sequential color sub-frame with respect to a display position on the CSD of the first temporally sequential color sub-frame. In accordance with example embodiments, the position adjustment corresponds to the expected change in position of the eye, determined at step 1004.

In further accordance with example embodiments, the CSD may compute a subsequent expected change in position of the eye with respect to the CSD over the sub-frame period between the second temporally sequential color sub-frame and the third temporally sequential color sub-frame. Then based on the computed subsequent expected change in position, the HMD can adjust a display position on the CSD of the third temporally sequential color sub-frame with respect to the adjusted display position on the CSD of the second temporally sequential color sub-frame. Again, the computation of the subsequent expected change in position of the eye with respect to the CSD is based on the eye motion determined at step 1002. This process may be repeated for further, subsequent color sub-frames, thereby continuously compensating for the determined motion of the eye.

In accordance with example embodiments, the video display image can be made up of temporally sequential frames. Each of the temporally sequential frames can, in turn, be made up of a temporal sequence of N color sub-frames corresponding to N display colors. As such, displaying the first, second, and third temporally sequential color sub-frames could correspond to displaying the temporal sequence of the N=3 color sub-frames of each of the temporally sequential frames. For example, the N=3 color sub-frames could be a red (R), a green (G), and a blue (B) color sub-frame. Other values of N could be used, as well as other colors.

In further accordance with example embodiments, the CSD could include a display region bounded by a display border, and the HMD could crop (or cause the CSD to crop) any portion of the video image for which the position adjustment would result in incomplete color rendering. More particularly, the HMD could determine that adjusting the display position on the CSD of the second temporally sequential color sub-frame (e.g. one of the N color sub-frames) will cause at least part of the second temporally sequential sub-frame to be positioned outside of the display border. As described above, this could cause a portion of the display region to display fewer than the N display colors for the given temporally sequential frame. The HMD could responsively crop the portion of the display region in which the fewer than the N display colors for the given temporally sequential frame will be displayed.

In accordance with example embodiments, the HMD may be equipped with an eye-tracking camera, and use the eye-tracking camera to determine the motion of the eye of the user with respect to the CSD. As described above, motion of the eye of the user of the HMD with respect to the CSD could correspond to angular motion of an eye-gaze direction of the eye of the user with respect to the CSD.

In further accordance with example embodiments, the HMD may be equipped with a motion detector, such as that described above in the example HMD of FIGS. 1a-1d. The HMD could then determine motion of the eye of the user of the HMD with respect to the CSD by measuring motion of the HMD with the motion detector, and analytically converting the measured motion of the HMD into computed motion of the CSD with respect to the eye of the user of the HMD. For example, the motion detector could include a three-axis accelerometer and a three-axis gyroscope, and measuring motion of the HMD could correspond to measuring both angular movement and linear movement. Motion of the eye of the user of the HMD with respect to the CSD could then include translational motion, as well as angular motion.

In still further accordance with example embodiments, the HMD could determine motion of the eye of the user of the HMD with respect to the CSD by analytically combining both the tracked motion of the eye with the measured motion of the HMD into computed motion of the CSD with respect to the eye of the user of the HMD.

Also in accordance with example embodiments, the HMD could determine motion of the eye of the user of the HMD with respect to the CSD by measuring motion of the eye of the user at a measuring rate that exceeds the sub-frame rate. By doing so, the HMD could predict the position of the eye-gaze direction in the display plane of the CSD prior to display of a given one of the color sub-frames.

Thus, in accordance with example embodiments, computing the expected change in position of the eye with respect to the CSD could correspond to determining a predicted change in angular orientation of an eye-gaze direction of the eye with respect to the display plane of the CSD as a function of the determined motion. For example the HMD could determine a location of a first point in the display plane of the CSD corresponding to a first eye-gaze direction of the eye at a time of display of the first temporally sequential color sub-frame. Then prior to the time of display of the second temporally sequential color sub-frame, the functional relation could be used to predict a location of a second point in the display plane of the CSD corresponding to a predicted eye-gaze of the eye at a time of display of the second temporally sequential color sub-frame.

As described above, the expected change in position could correspond to a change from (i) a first eye-gaze direction of the eye in a plane of the CSD at a time of the first temporally sequential color sub-frame to (ii) a second eye-gaze direction of the eye in the plane of the CSD at a time of the second temporally sequential color sub-frame. Then, in accordance with example embodiments, adjusting the display position on the CSD of the second temporally sequential color sub-frame based on the computed expected change in position could correspond to displaying the second temporally sequential sub-frame at a relative position with respect to the second eye-gaze direction that is substantially the same as a relative position of the first temporally sequential sub-frame with respect to the first eye-gaze direction.

More particularly, the display plane of the CSD could include a two-dimensional pixel array. In this arrangement, the first eye-gaze direction could correspond to a first pixel location in the pixel array, and the second eye-gaze direction corresponds to a second pixel location in the pixel array. As such, displaying the second temporally sequential sub-frame at a relative position with respect to the second eye-gaze direction that is substantially the same as a relative position of the first temporally sequential sub-frame with respect to the first eye-gaze direction could correspond to offsetting a display position of the second temporally sequential sub-frame relative to a display position of the first temporally sequential sub-frame by an amount equal to an offset from the first pixel location to the second pixel location.

It will be appreciated that the method described could be implemented in other computer-based systems that include a CSD, besides a wearable HMD. Thus, in general, the method could be include determining motion of an eye with respect to the CSD, while displaying temporally sequential color sub-frames of a display image on the CSD. An expected change in position of the eye with respect to the CSD from one temporally sequential color sub-frame to a next temporally sequential color sub-frame could then be computed, based on the determined motion. Finally, a display position on the CSD of the next temporally sequential color sub-frame with respect to a display position on the CSD of the one temporally sequential color sub-frame could be adjusted, based on the computed expected change in position.

It will further be appreciated that the steps shown in FIG. 10 are meant to illustrate operation of an example embodiment. As such, various steps could be altered or modified, the ordering of certain steps could be changed, and additional steps could be added, while still achieving the overall desired operation.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. In a wearable head-mounted display (HMD), a computer-implemented method comprising:
    while displaying temporally sequential color sub-frames of a video display image on a color-sequential display (CSD) of the HMD, determining motion of an eye of a user of the HMD with respect to the CSD;
    based on the determined motion, computing an expected change in position of the eye with respect to the CSD over a time interval from a first temporally sequential color sub-frame to a second temporally sequential color sub-frame that follows the first temporally sequential color sub-frame; and
    based on the computed expected change in position, compensating for the determined motion of the eye by adjusting a display position on the CSD of the second temporally sequential color sub-frame with respect to a display position on the CSD of the first temporally sequential color sub-frame,
    wherein computing the expected change in position of the eye with respect to the CSD over the time interval from the first temporally sequential color sub-frame to the second temporally sequential color sub-frame based on the determined motion comprises:
    determining a predicted change in angular orientation of an eye-gaze direction of the eye with respect to a plane of the CSD as a function of the determined motion over the time interval from the first temporally sequential color sub-frame to the second temporally sequential color sub-frame.

2. The method of claim 1, wherein the second temporally sequential color sub-frame is followed by a third temporally sequential color sub-frame, the method further comprising:
    based on the determined motion, computing a subsequent expected change in position of the eye with respect to the CSD over a time interval from the second temporally sequential color sub-frame to the third temporally sequential color sub-frame; and
    based on the computed subsequent expected change in position, adjusting a display position on the CSD of the third temporally sequential color sub-frame with respect to the adjusted display position on the CSD of the second temporally sequential color sub-frame.

3. The method of claim 1, wherein the video display image comprises temporally sequential frames, each of the temporally sequential frames comprising a temporal sequence of N color sub-frames corresponding to N display colors,
    and wherein displaying the temporally sequential color sub-frames of the video display image on the CSD comprises displaying the temporal sequence of the N color sub-frames of each of the temporally sequential frames.

4. The method of claim 3, wherein N=3, and the N color sub-frames of each of the temporally sequential frames comprise a red (R), a green (G), and a blue (B) color sub-frame of each of the temporally sequential frames.

5. The method of claim 3, wherein the CSD comprises a display region bounded by a display border,
    wherein the second temporally sequential color sub-frame is one of the N color sub-frames of a given temporally sequential frame,
    and wherein the method further comprises:
    determining that adjusting the display position on the CSD of the second temporally sequential color sub-frame will cause at least part of the second temporally sequential sub-frame to be positioned outside of the display border, and thereby cause a portion of the display region to display fewer than the N display colors for the given temporally sequential frame; and
    in response, cropping the portion of the display region in which the fewer than the N display colors for the given temporally sequential frame will be displayed.

6. The method of claim 1, wherein determining motion of the eye of the user of the HMD with respect to the CSD comprises tracking motion of the eye with an eye-tracking camera of the HMD.

7. The method of claim 1, wherein determining motion of the eye of the user of the HMD with respect to the CSD comprises determining angular motion of an eye-gaze direction of the eye of the user with respect to the CSD.

8. The method of claim 1, wherein determining motion of the eye of the user of the HMD with respect to the CSD comprises:
    measuring motion of the HMD with a motion detector of the HMD; and analytically converting the measured motion of the HMD into computed motion of the CSD with respect to the eye of the user of the HMD.

9. The method of claim 8, wherein the motion detector comprises a three-axis accelerometer and a three-axis gyroscope,
and wherein measuring motion of the HMD comprises measuring both angular movement and linear movement.

10. The method of claim 1, wherein determining motion of the eye of the user of the HMD with respect to the CSD comprises:
tracking motion of the eye with an eye-tracking camera of the HMD;
measuring motion of the HMD with a motion detector of the HMD; and
analytically combining the tracked motion of the eye with the measured motion of the HMD into computed motion of the CSD with respect to the eye of the user of the HMD.

11. The method of claim 1, wherein the CSD is configured to display the temporally sequential color sub-frames at a sub-frame rate,
and wherein determining motion of the eye of the user of the HMD with respect to the CSD comprises measuring motion of the eye of the user at a measuring rate that exceeds the sub-frame rate.

12. In a wearable head-mounted display (HMD), a computer-implemented method comprising:
while displaying temporally sequential color sub-frames of a video display image on a color-sequential display (CSD) of the HMD, determining motion of an eye of a user of the HMD with respect to the CSD;
based on the determined motion, computing an expected change in position of the eye with respect to the CSD over a time interval from a first temporally sequential color sub-frame to a second temporally sequential color sub-frame that follows the first temporally sequential color sub-frame; and
based on the computed expected change in position, compensating for the determined motion of the eye by adjusting a display position on the CSD of the second temporally sequential color sub-frame with respect to a display position on the CSD of the first temporally sequential color sub-frame,
wherein computing the expected change in position of the eye with respect to the CSD over the time interval from the first temporally sequential color sub-frame to the second temporally sequential color sub-frame based on the determined motion comprises:
determining a location of a first point in a plane of the CSD corresponding to a first eye-gaze direction of the eye at a time of display of the first temporally sequential color sub-frame; and
based on the determined location of the first point and the determined motion, making a prediction of a location of a second point in the plane of the CSD corresponding to a predicted eye-gaze of the eye at a time of display of the second temporally sequential color sub-frame, the prediction being made prior to the time of display of the second temporally sequential color sub-frame.

13. The method of claim 1, wherein the expected change in position corresponds to a change from (i) a first eye-gaze direction of the eye in a plane of the CSD at a time of the first temporally sequential color sub-frame to (ii) a second eye-gaze direction of the eye in the plane of the CSD at a time of the second temporally sequential color sub-frame,
and wherein adjusting the display position on the CSD of the second temporally sequential color sub-frame based on the computed expected change in position comprises displaying the second temporally sequential sub-frame at a relative position with respect to the second eye-gaze direction that is substantially the same as a relative position of the first temporally sequential sub-frame with respect to the first eye-gaze direction.

14. The method of claim 13, wherein the plane of the CSD comprises a two-dimensional pixel array,
wherein the first eye-gaze direction corresponds to a first pixel location in the pixel array, and the second eye-gaze direction corresponds to a second pixel location in the pixel array,
and wherein displaying the second temporally sequential sub-frame at a relative position with respect to the second eye-gaze direction that is substantially the same as a relative position of the first temporally sequential sub-frame with respect to the first eye-gaze direction comprises offsetting a display position of the second temporally sequential sub-frame relative to a display position of the first temporally sequential sub-frame by an amount equal to an offset from the first pixel location to the second pixel location.

15. In a system including a color-sequential display (CSD), a computer-implemented method comprising:
while displaying temporally sequential color sub-frames of a display image on the CSD, determining motion of an eye with respect to the CSD;
based on the determined motion, computing an expected change in position of the eye with respect to the CSD from one temporally sequential color sub-frame to a next temporally sequential color sub-frame; and
based on the computed expected change in position, adjusting a display position on the CSD of the next temporally sequential color sub-frame with respect to a display position on the CSD of the one temporally sequential color sub-frame,
wherein computing the expected change in position of the eye with respect to the CSD from the one temporally sequential color sub-frame to the next temporally sequential color sub-frame comprises:
determining a predicted change in angular orientation of an eye-gaze direction of the eye with respect to a plane of the CSD as a function of the determined motion over the time interval from the one temporally sequential color sub-frame to the next temporally sequential color sub-frame.

16. A wearable head-mounted display (HMD) comprising:
means for determining motion of an eye of a user of the HMD with respect to a color-sequential display (CSD) of the HMD, while displaying temporally sequential color sub-frames of a video display image on the CSD;
means for computing an expected change in position of the eye with respect to the CSD over a time interval from a first temporally sequential color sub-frame to a second temporally sequential color sub-frame that follows the first temporally sequential color sub-frame, wherein the computing is based on the determined motion; and
means for using the computed expected change in position to compensate for the determined motion of the eye by adjusting a display position on the CSD of the second temporally sequential color sub-frame with respect to a display position on the CSD of the first temporally sequential color sub-frame,
wherein the expected change in position corresponds to a change from (i) a first eye-gaze direction of the eye in a plane of the CSD at a time of the first temporally sequential color sub-frame to (ii) a second eye-gaze direction of the eye in the plane of the CSD at a time of the second temporally sequential color sub-frame, and wherein adjusting the display position on the CSD of the second temporally sequential color sub-frame based on the computed expected change in position comprises displaying the second temporally sequential sub-frame at a relative position with respect to the second eye-gaze direction that is substantially the same as a relative position of the first temporally sequential sub-frame with respect to the first eye-gaze direction.

17. The wearable HMD of claim 16, wherein the second temporally sequential color sub-frame is followed by a third temporally sequential color sub-frame, the wearable HMD further comprising:

means for computing a subsequent expected change in position of the eye with respect to the CSD over a time interval from the second temporally sequential color sub-frame to the third temporally sequential color sub-frame; and means for adjusting a display position on the CSD of the third temporally sequential color sub-frame with respect to the adjusted display position on the CSD of the second temporally sequential color sub-frame.

18. The wearable HMD of claim 16, wherein the video display image comprises temporally sequential frames, each of the temporally sequential frames comprising a temporal sequence of a red (R) color sub-frame, a green (G) color sub-frame, and a blue (B) color sub-frame, the temporal sequence corresponding to N=3 display colors, and wherein displaying the temporally sequential color sub-frames of the video display image on the CSD comprises displaying the temporal sequence of the R color sub-frame, the G color sub-frame, and the B color sub-frame of each of the temporally sequential frames.

19. The wearable HMD of claim 18, wherein the CSD comprises a display region bounded by a display border, wherein the second temporally sequential color sub-frame is one of the R color sub-frame, the G color sub-frame, and the B color sub-frame of a given temporally sequential frame, and wherein the wearable HMD further comprises:

means for making a determination that adjusting the display position on the CSD of the second temporally sequential color sub-frame will cause at least part of the second temporally sequential sub-frame to be positioned outside of the display border, and thereby cause a portion of the display region to display fewer than the N=3 display colors for the given temporally sequential frame; and means for responding to the determination by cropping the portion of the display region in which the fewer than the N=3 display colors for the given temporally sequential frame will be displayed.

20. The wearable HMD of claim 16, wherein means for determining motion of the eye of the user of the HMD with respect to the CSD comprise means for analyzing eye-tracking data from an eye-tracking camera of the HMD to determine angular motion of an eye-gaze direction of the eye of the user with respect to the CSD.

21. The wearable HMD of claim 16, wherein means for determining motion of the eye of the user of the HMD with respect to the CSD comprises:

means for analyzing eye-tracking data from an eye-tracking camera of the HMD to determine angular motion of an eye-gaze direction of the eye of the user with respect to the CSD;

means for analyzing motion data from a motion detector of the HMD to determine both angular movement and linear movement the HMD;

means for analytically converting the angular movement and linear movement the HMD into computed motion of the CSD with respect to the eye of the user of the HMD; and means for analytically combining the eye-tracking data with the motion of the HMD into an eye-gaze direction of the eye of the user with respect to the CSD.

22. The wearable HMD of claim 16, wherein the CSD is configured to display the temporally sequential color sub-frames at a sub-frame rate, and wherein means for determining the motion of the eye of the user of the HMD with respect to the CSD comprise means for measuring motion of the eye of the user at a measuring rate that exceeds the sub-frame rate.

23. The wearable HMD of claim 16, wherein the plane of the CSD comprises a two-dimensional pixel array, wherein the first eye-gaze direction corresponds to a first pixel location in the pixel array, and the second eye-gaze direction corresponds to a second pixel location in the pixel array, and wherein displaying the second temporally sequential sub-frame at a relative position with respect to the second eye-gaze direction that is substantially the same as a relative position of the first temporally sequential sub-frame with respect to the first eye-gaze direction comprises offsetting a display position of the second temporally sequential sub-frame relative to a display position of the first temporally sequential sub-frame by an amount equal to an offset from the first pixel location to the second pixel location.

24. A non-transitory computer-readable medium having instructions stored thereon that, upon execution by one or more processors of a wearable head-mounted display (HMD), cause the wearable HMD to carry out operations comprising:

while displaying temporally sequential color sub-frames of a video display image on a color-sequential display (CSD) of the HMD, determining motion of an eye of a user of the HMD with respect to the CSD;

based on the determined motion, computing an expected change in position of the eye with respect to the CSD over a time interval from a first temporally sequential color sub-frame to a second temporally sequential color sub-frame that follows the first temporally sequential color sub-frame; and based on the computed expected change in position, compensating for the determined motion of the eye by adjusting a display position on the CSD of the second temporally sequential color sub-frame with respect to a display position on the CSD of the first temporally sequential color sub-frame, wherein computing the expected change in position of the eye with respect to the CSD over the time interval from the first temporally sequential color sub-frame to the second temporally sequential color sub-frame based on the determined motion comprises:

determining a location of a first point in a plane of the CSD corresponding to a first eye-gaze direction of the eye at a time of display of the first temporally sequential color sub-frame; and based on the determined location of the first point and the determined motion, making a prediction of a location of a second point in the plane of the CSD corresponding to a predicted eye-gaze of the eye at a time of display of the second temporally sequential color sub-frame, the prediction being made prior to the time of display of the second temporally sequential color sub-frame.

25. The non-transitory computer-readable medium of claim 24, wherein the second temporally sequential color sub-frame is followed by a third temporally sequential color sub-frame, and wherein the operations further comprise:

based on the determined motion, computing a subsequent expected change in position of the eye with respect to the CSD over a time interval from the second temporally sequential color sub-frame to the third temporally sequential color sub-frame; and based on the computed subsequent expected change in position, adjusting a display position on the CSD of the third temporally sequential color sub-frame with respect to the adjusted display position on the CSD of the second temporally sequential color sub-frame.

26. The non-transitory computer-readable medium of claim 24, wherein the video display image comprises temporally sequential frames, each of the temporally sequential frames comprising a temporal sequence of N color sub-frames corresponding to N display colors, and wherein displaying the temporally sequential color sub-frames of the video display image on the CSD comprises displaying the temporal sequence of the N color sub-frames of each of the temporally sequential frames.

27. The non-transitory computer-readable medium of claim 26, wherein N=3, and the N color sub-frames of each of the temporally sequential frames comprise a red (R), a green (G), and a blue (B) color sub-frame of each of the temporally sequential frames.

28. The non-transitory computer-readable medium of claim 26, wherein the CSD comprises a display region bounded by a display border, wherein the second temporally sequential color sub-frame is one of the N color sub-frames of a given temporally sequential frame, and wherein the method further comprises:

determining that adjusting the display position on the CSD of the second temporally sequential color sub-frame will cause at least part of the second temporally sequential sub-frame to be positioned outside of the display border, and thereby cause a portion of the display region to display fewer than the N display colors for the given temporally sequential frame; and in response, cropping the portion of the display region in which the fewer than the N display colors for the given temporally sequential frame will be displayed.

29. The non-transitory computer-readable medium of claim 24, wherein determining motion of the eye of the user of the HMD with respect to the CSD comprises analyzing eye-tracking data from an eye-tracking camera of the HMD to determine angular motion of an eye-gaze direction of the eye of the user with respect to the CSD.

30. The non-transitory computer-readable medium of claim 24, wherein determining motion of the eye of the user of the HMD with respect to the CSD comprises:

analyzing motion data from a motion detector of the HMD to determine both angular movement and linear movement the HMD; and analytically converting the angular movement and linear movement the HMD into computed motion of the CSD with respect to the eye of the user of the HMD.

31. The non-transitory computer-readable medium of claim 24, wherein determining motion of the eye of the user of the HMD with respect to the CSD comprises:

analyzing eye-tracking data from an eye-tracking camera of the HMD to determine angular motion of an eye-gaze direction of the eye of the user with respect to the CSD;

analyzing motion data from a motion detector of the HMD to determine both angular movement and linear movement the HMD;

analytically converting the angular movement and linear movement the HMD into computed motion of the CSD with respect to the eye of the user of the HMD;

analytically combining the eye-tracking data with the motion of the HMD into an eye-gaze direction of the eye of the user with respect to the CSD.

32. The non-transitory computer-readable medium of claim 24, wherein the expected change in position corresponds to a change from (i) a first eye-gaze direction of the eye in a plane of the CSD at a time of the first temporally sequential color sub-frame to (ii) a second eye-gaze direction of the eye in the plane of the CSD at a time of the second temporally sequential color sub-frame, and wherein adjusting the display position on the CSD of the second temporally sequential color sub-frame based on the computed expected change in position comprises displaying the second temporally sequential sub-frame at a relative position with respect to the second eye-gaze direction that is substantially the same as a relative position of the first temporally sequential sub-frame with respect to the first eye-gaze direction.

33. The non-transitory computer-readable medium of claim 32, wherein the plane of the CSD comprises a two-dimensional pixel array, wherein the first eye-gaze direction corresponds to a first pixel location in the pixel array, and the second eye-gaze direction corresponds to a second pixel location in the pixel array, and wherein displaying the second temporally sequential sub-frame at a relative position with respect to the second eye-gaze direction that is substantially the same as a relative position of the first temporally sequential sub-frame with respect to the first eye-gaze direction comprises offsetting a display position of the second temporally sequential sub-frame relative to a display position of the first temporally sequential sub-frame by an amount equal to an offset from the first pixel location to the second pixel location.

34. A non-transitory computer-readable medium having instructions stored thereon that, upon execution by one or more processors of a system, cause the system to carry out operations comprising:

while displaying temporally sequential color sub-frames of a display image on a color-sequential display (CSD) of the system, determining motion of an eye with respect to the CSD;

based on the determined motion, computing an expected change in position of the eye with respect to the CSD from one temporally sequential color sub-frame to a next temporally sequential color sub-frame; and based on the computed expected change in position, adjusting a display position on the CSD of the next temporally sequential color sub-frame with respect to a display position on the CSD of the one temporally sequential color sub-frame, wherein computing the expected change in position of the eye with respect to the CSD from the one temporally sequential color sub-frame to the next temporally sequential color sub-frame comprises:

determining a predicted change in angular orientation of an eye-gaze direction of the eye with respect to a plane of the CSD as a function of the determined motion over the time interval from the one temporally sequential color sub-frame to the next temporally sequential color sub-frame.

* * * * *